United States Patent
Choi et al.

(10) Patent No.: US 10,142,946 B2
(45) Date of Patent: Nov. 27, 2018

(54) METHOD AND DEVICE FOR TRANSMITTING D2D DISCOVERY SIGNAL BY TERMINAL IN WIRELESS COMMUNICATION SYSTEM

(71) Applicants: Samsung Electronics Co., Ltd., Suwon-si, Gyeonggi-do (KR); SUNGKYUNKWAN UNIVERSITY RESEARCH & BUSINESS FOUNDATION, Suwon-si, Gyeonggi-do (KR)

(72) Inventors: Hyungjin Choi, Seoul (KR); Hyunseok Ryu, Yongin-si (KR); Juhyung Song, Seoul (KR); Wonjun Hwang, Suwon-si (KR); Seunghoon Park, Seoul (KR); Peng Xue, Hwaseong-si (KR)

(73) Assignees: Samsung Electronics Co., Ltd., Suwon-si (KR); Sungkyunkwan University Research & Business Foundation, Suwon-si, Gyeonggi-do (KR)

(*) Notice: Subject to any disclaimer, the term of this patent is extended or adjusted under 35 U.S.C. 154(b) by 168 days.

(21) Appl. No.: 14/829,115

(22) Filed: Aug. 18, 2015

(65) Prior Publication Data
US 2016/0050635 A1     Feb. 18, 2016

(30) Foreign Application Priority Data
Aug. 18, 2014   (KR) .......................... 10-2014-0107281

(51) Int. Cl.
*H04W 52/38*      (2009.01)
*H04W 72/04*      (2009.01)
*H04W 52/24*      (2009.01)
*H04W 8/00*      (2009.01)
*H04L 5/00*      (2006.01)
*H04W 88/06*      (2009.01)

(52) U.S. Cl.
CPC ......... *H04W 52/383* (2013.01); *H04L 5/0007* (2013.01); *H04W 52/242* (2013.01); *H04W 8/005* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 9,548,843 B2* | 1/2017 | Seo | H04B 7/2656 |
| 10,064,041 B2* | 8/2018 | Seo | H04W 8/005 |
| 2015/0078466 A1* | 3/2015 | Zhou | H04W 56/004 |
| | | | 375/260 |
| 2015/0245193 A1* | 8/2015 | Xiong | H04W 4/008 |
| | | | 370/328 |
| 2015/0282132 A1* | 10/2015 | Kim | H04W 8/005 |
| | | | 370/329 |

(Continued)

*Primary Examiner* — Steve R Young
(74) *Attorney, Agent, or Firm* — Jefferson IP Law, LLP

(57) ABSTRACT

A method for determining a device-to-device (D2D) symbol having orthogonality maintained (hereinafter, a position of the D2D symbol having orthogonality maintained) between single carrier-frequency division multiple access (SC-FDMA) sub-carriers among physical uplink control channel (PUCCH)/D2D signals, a method for determining the power of the symbol having orthogonality maintained, and a method for transmitting additional information in accordance with selective power control is provided.

20 Claims, 20 Drawing Sheets

(56) References Cited

U.S. PATENT DOCUMENTS

2016/0142898 A1* 5/2016 Poitau ............... H04W 72/0413
 370/329
2018/0115386 A1* 4/2018 Shin .................. H04L 27/00
2018/0175968 A1* 6/2018 Shin .................. H04L 27/34

* cited by examiner

METHOD AND DEVICE FOR TRANSMITTING D2D DISCOVERY SIGNAL BY TERMINAL IN WIRELESS COMMUNICATION SYSTEM

CROSS-REFERENCE TO RELATED APPLICATION(S)

This application claims the benefit under 35 U.S.C. § 119(a) of a Korean patent application filed on Aug. 18, 2014 in the Korean Intellectual Property Office and assigned Serial number 10-2014-0107281, the entire disclosure of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) Samsung Electronics Co., Ltd. and 2) Sungkyunkwan University Research & Business Foundation.

TECHNICAL FIELD

The present disclosure relates to a method for transmitting a device-to-device (D2D) discovery signal by a terminal in a wireless communication system. More specifically, the present disclosure relates to a peer discovery technology for long term evolution (LTE) based D2D that uses a frequency band of an LTE cellular system.

BACKGROUND

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

Meanwhile, the device-to-device (D2D) technology refers to a technology related to terminals, which are located close to each other, that exchange traffic by forming a direct link without the relay of an existing infrastructure to disperse the load of a base station, such as an evolved Node B (eNB), and transmit over a relatively short distance to reduce the power consumption of the terminal and also to have the advantage of reducing the transmission delay (i.e., latency).

An early-stage D2D communication technology has been developed and standardized in non-licensed bandwidths, such as, wireless fidelity (Wi-Fi) Direct and Bluetooth®. However, technology development and standardization for supporting the D2D communication have been in progress in a cellular system that uses the licensed bandwidth. Typically, a 3rd Generation Partnership Project (3GPP), which is a mobile communication standardization organization, has been undertaking a long term evolution (LTE)-based D2D technical standardization process called proximity-based services (ProSe) as one of the new technologies included in the LTE release 12.

The standardization of the LTE-based D2D technology is in progress to develop a terminal discovery process by which each terminal discovers other terminals in the surrounding areas of the terminal itself, and a D2D communication function directly communicates between adjacent terminals. In regard to the terminal discovery process, discussions are underway for a discovery channel structure, a resource allocation/selection method, a transmission time determination method, and a transmission power determination method.

The D2D discovery process identifies the presence of nearby terminals through a separate signal exchange between terminals in a pre-configured discovery channel, and identifies the proximity of the nearby terminals. In an LTE-based D2D discovery process, each terminal transmits a discovery signal defined by the base station for informing of the presence of the terminal itself to a neighborhood terminal in any sub-frame in a channel for terminal discovery, and performs discovery for the adjacent terminal by receiving discovery signals of other terminals during the other discovery channel interval. At this time, the terminal discovery channel can be allocated to an uplink bandwidth or within uplink time interval, and is designed to allow cellular physical uplink control channel (PUCCH) signal transmission in a terminal discovery channel for the normal operation of a cellular network. Further, to maintain orthogonality between the terminal discovery signals based on the OFDM of a cellular network and to ensure a sufficient distance range, a specification of a guard interval (cyclic prefix (CP)) for terminal discovery signals may be determined as either a normal CP or an extended CP regardless of the specifications for the cellular signals.

On the other hand, in order to mitigate adjacent sub-carrier interference (inter-carrier interference (ICI)) generated during simultaneous scheduling of the terminal discovery signal and the cellular PUCCH signal, a method has been agreed to perform power control in the same way with a terminal discovery signal or a conventional cellular physical uplink shared channel (PUSCH). That is, as the transmission power of the discovery signal is proportional to the distance difference with the base station, the transmission power of the discovery signal is lowered as a D2D terminal (DUE) is closer to the base station. Such a decision mitigates the near-far problem generated at the time of the simultaneous reception of a PUCCH signal and a D2D discovery signal in the base station to improve the problem of a reduced reception signal to interference plus noise power ratio (SINR) of the cellular PUCCH signal due to the D2D discovery signal. However, in the case of DUE adjacent to the base station, there is a problem in that the transmission power of the discovery signal is too low for a sufficient discovery radius to be guaranteed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method that can ensure the distance range of the discovery signal by limiting the signal to interference plus noise power ratio (SINR) degradation of the cellular physical uplink control channel (PUCCH) signal generated due to the device-to-device (D2D) discovery signal to an appropriate level and by maintaining the transmission power of the D2D discovery signal as high as possible. Specifically, disclosed is a selective power control method of a D2D discovery signal applicable to a condition in which cyclic prefix (CP) standards between of a cellular signal and of a D2D discovery signal are different from each other.

The power control technique of the present disclosure transmits the symbol having orthogonality maintained at a higher power than the transmission power determined by a conventional power control considering that the orthogonality is guaranteed at the location of the particular symbol in a sub-frame based on the time difference at which the respective signals are received by the base station if the CP standards of the cellular signal and the D2D discovery signal are different from each other.

Whereas, for practical application of the disclosure, elements, such as the position of the symbol for amplifying the power, the amount of power amplification, and a method of transmitting additional information associated with the selective power control may be determined. Therefore, in the present disclosure, disclosed is a method of determining the elements by considering CP standards of D2D discovery signals, base station-D2D terminals (DUE) distance, a scheduling method of D2D discovery signals, and the like.

In order to achieve the above purpose, the present disclosure provides a method for transmitting a D2D discovery signal by a terminal in a wireless communication system. The method including determining a first symbol for a D2D discovery signal, determining a transmission power to be applied to the first symbol, and transmitting the D2D discovery signal with the transmission power.

Further, a terminal for transmitting a D2D discovery signal in a wireless communication system according to an embodiment of the present disclosure includes a transceiver configured to transmit and receive a signal, and a controller configured to determine a first symbol for a D2D discovery signal, determine a transmission power to be applied to the first symbol, and transmits the D2D discovery signal with the determined transmission power.

Further, according to an embodiment of the present disclosure, a method for scheduling a D2D discovery signal by a base station in a wireless communication system is provided. The method includes determining a power amplification value for determining a transmission power of a first symbol for a D2D discovery signal and transmitting, to a terminal, information on the transmission power of the first symbol through an upper layer signaling.

Further, according to an embodiment of the present disclosure, a base station for scheduling a D2D discovery signal in a wireless communication system is provided. The base station includes a transceiver configured to transmit and receives a signal; and a controller determine a power amplification value for determining a transmission power to of a first symbol for a D2D discovery signal and transmit information on the transmission power of the first symbol to a terminal through an upper layer signaling.

In accordance with an aspect of the present disclosure, selective transmission power control for a D2D signal is performed and thus the reception performance of a D2D discovery signal can be enhanced while minimizing interference that affects the existing cellular system. Further, by limiting the SINR degradation of the cellular PUCCH signal due to the D2D discovery signal to an appropriate level and maintaining the transmission power of the D2D discovery signal as high as possible, the distance range of the discovery signal can be guaranteed. Furthermore, according to the present disclosure, the reception power for each symbol is predicted by synthesizing additional information received by a reception D2D terminal and thus an automatic gain control (AGC) gain value can be quickly adjusted.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the various embodiments of the present disclosure, descriptions related to technical contents which are well-known in the art to which the present disclosure pertains, and are not directly associated with the present disclosure, will be omitted. Such an omission of unnecessary descriptions is intended to prevent obscuring of the main idea of the present disclosure and more clearly transfer the main idea.

The specific terms used herein are provided for ease of understanding the present disclosure, and such specific terms may be changed into other forms without departing from the spirit and scope of the present disclosure.

Herein, orthogonality is maintained refers to a state or property of being able to work together two or more signals without affecting each other, and when two signals are orthogonal to each other, convolution output of two signals is 0 and the two signals are not relevant to each other and can be distinguished from each other.

Figure 1:
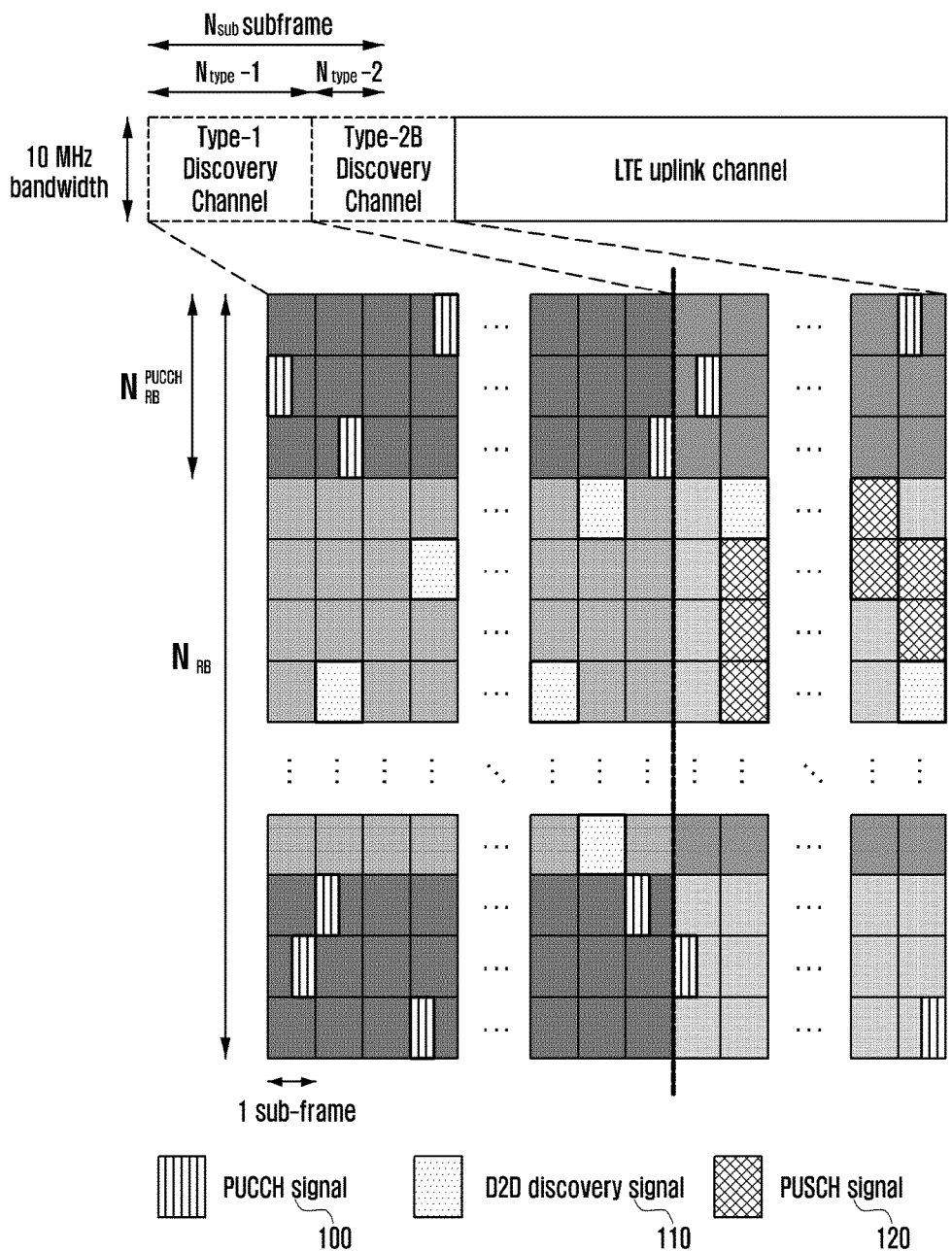
FIG. 1 is a diagram showing the structure of a device-to-device (D2D) discovery channel according to an embodiment of the present disclosure.

FIG. 1 is a diagram showing the structure of a device-to-device (D2D) discovery channel according to an embodiment of the present disclosure.

A discovery channel for a D2D terminal discovery, as shown in FIG. 1, may use a plurality of consecutive sub-frames as a separate discovery signal transmission channel. At this time, to ensure control of the channel transmission of the cellular terminal in a discovery signal transmission channel, a portion of the upper and lower side bands in the discovery channel can be allocated to a zone for a physical uplink control channel (PUCCH) signal 100. A zone for a PUCCH signal 100 may utilize three resource blocks (RB) in the upper and lower bands per sub-frame, respectively, and hopping can be applied to a PUCCH signal in one physical resource block (PRB) size and in slot units, but the RBs are not limited thereto.

The remaining zone, except for the zone for the PUCCH signal 100, corresponds to discovery resources, and the discovery signal 110 of each D2D terminal can be allocated to a predetermined number of PRB within a discovery resource region and transmitted thereto. On the other hand, the discovery signal 110 can be applied by a distributed scheduling method (hereinafter, Type-1) for each terminal to randomly select the resources to be transmitted, or a method for direct scheduling (hereinafter, Type-2B) of a discovery signal by the base station can be applied to some RRC_CONNECTED terminals. At this time, in the case of the Type-1 terminal discovery method, a cellular physical uplink shared channel (PUSCH) signal interval and a D2D terminal discovery interval is separated to time division multiplexing (TDM) form, and thus the cellular PUSCH signal is not scheduled in the terminal discovery channel. In the case of the Type-2B terminal discovery method, a cellular PUSCH signal and a terminal discovery signal can be scheduled simultaneously with frequency division multiplexing (FDM). Type-1 and Type-2B discovery methods, as illustrated in the example in FIG. 1, can be applied simultaneously within one discovery channel to different sub-frames different, or only one discovery method can be applied to the entire discovery channel area.

Typically, for the PUCCH signal, a RB resource is selected for transmitting a PUCCH signal by scheduling of the base station. In addition, the transmission time for the PUCCH signal can be based on a timing advance (TA) value, which corresponds to a time difference depending on the distance difference between a base station and a terminal, that is allocated to allow terminals existing in the different locations within the cell managed by the base station itself to transmit data and control information in the uplink at an identical time zone. That is, the terminal may transmit the PUCCH in consideration of the time to which TA configured by the base station, according to the distance difference between the base station and the terminal, is applied to only the terminal of the RRC_CONNECTED state to maintain the orthogonality in the base station. In addition, the base station can perform a power control on the terminal for controlling the transmission power of a terminal signal based on a downlink power attenuation amount received from the base station. This is a power control method, defined in an long term evolution (LTE) uplink, in which that the terminal guarantees the same reception power from all terminals in a cell, and the transmission power $P_{Tx\text{-}PUCCH}$ can be defined by equation 1 as follows:

$$P_{Tx\text{-}PUCCH}[\text{dBm}]=\min\{P_{max}, P_{0\_PUCCH}+PL\} \qquad \text{Equation 1}$$

Here, $P_{max}$ is a maximum transmission power of a terminal in a cellular network, and $P_{0\_PUCCH}$ indicates that the power control reference power of the cellular PUCCH signal and the path loss control constant of the PUCCH signal. In addition, PL is the amount of path loss that is estimated from the reception power (e.g., a reference signal received power (RSRP)) of the downlink reference signal. On the other hand, the transmission time of the D2D discovery signal can be different from the Type-1 discovery method and the Type-2B discovery method.

In the case of the terminal using the Type-1 discovery method, to set a common discovery signal transmission time in the RRC_CONNECTED terminal and RRC_IDLE terminal, unlike a typical cellular signal, a discovery signal is transmitted based on the downlink reception time in the base station without applying a terminal-specific TA.

In the case of a terminal using a Type-2B discovery method, because only RRC_CONNECTED terminals are involved in the discovery process, a discovery signal is transmitted at the time that the TA was applied to the typical cellular signal.

On the other hand, the D2D discovery signal is applied with the power control method of the same form as the cellular PUSCH signal, and as the result, transmission power $P_{Tx\text{-}D2D}$ of the D2D discovery signal can be defined by equation 2 as follows:

$$P_{Tx\text{-}D2D}[\text{dBm}]=\min\{P_{max}, 10\log_{10}(M_{D2D})+P_{0\_D2D}+\alpha_{D2D}\cdot PL+\Delta_{MCS}+f_{C\_D2D}\} \qquad \text{Equation 2}$$

Here, $M_{D2D}$ is the number of PRB to which the D2D discovery signal is allocated, $P_{0\_D2D}$ and $\alpha_{D2D}$ indicates a power control reference power and a path loss control constant of the D2D discovery signal, respectively. In addition, $\Delta_{MCS}$ is a power amplification factor determined according to modulation and coding scheme (MCS) level during the general PUSCH signal power control, and in general, the MCS level of the D2D discovery signal cannot be adaptively adjusted and thus $\Delta_{MCS}$ may not be substantially used or may be provided to all the D2D terminals as the same value. Further, $f_{C\_D2D}$ is a factor for controlling absolute power control or accumulated power control such as the D2D transmission power of RRC_CONNECTED terminal in a closed loop, and each terminal can acquire the $f_{C\_D2D}$ value by receiving a transmission power control (TPC) command within the physical downlink control channel (PDCCH) before the number of sub frames from the time point when the D2D discovery signal is transmitted. However, in various embodiments, closed-loop power control may not be performed for the terminal discovery signal. In this case, the $f_{C\_D2D}$ value may not be substantially used during the terminal discovery process. A power control parameter $P_{0\_PUCCH}$ for the cellular PUCCH signal and a power control parameter $P_{0\_D2D}$ for a D2D discovery signal corresponding to the power control parameter can be different from each other, and each of the parameters are selected as an appropriate value by the base station and are provided to terminals in a cell through a system information block (SIM) within a PDCCH.

A cyclic prefix (CP) standard, when single carrier-frequency division multiple access (SC-FDMA) signal modulation for transmission of the D2D discovery signal, may be determined to be any one of the normal CP of 5.21/4.69 µs length or the extended CP of 16.67 µs length, regardless of the CP standard for the cellular signal. As a result, in the operation, mismatch between the CP standard for the cellular signal and for standards for a D2D discovery signal can be generated. For example, in a small-cell environment in which inter-site distance (ISD) is 500 m or less, the CP for cellular signal can use the normal CP, however the CP for the D2D discovery signal can use an extended CP to ensure the discovery range is large enough by preventing inter-orthogonality disruption according to the reception time difference between the discovery signals. As different example, in a large-cell environment in which the ISD is large, CP for the cellular signal can be an extended CP due to the large multi-path delay according to the large cell radius, and a normal CP for terminal discovery within a particular space in which a high terminal density, such as an indoor hot-zone, can be applied the D2D signal.

Figure 2:
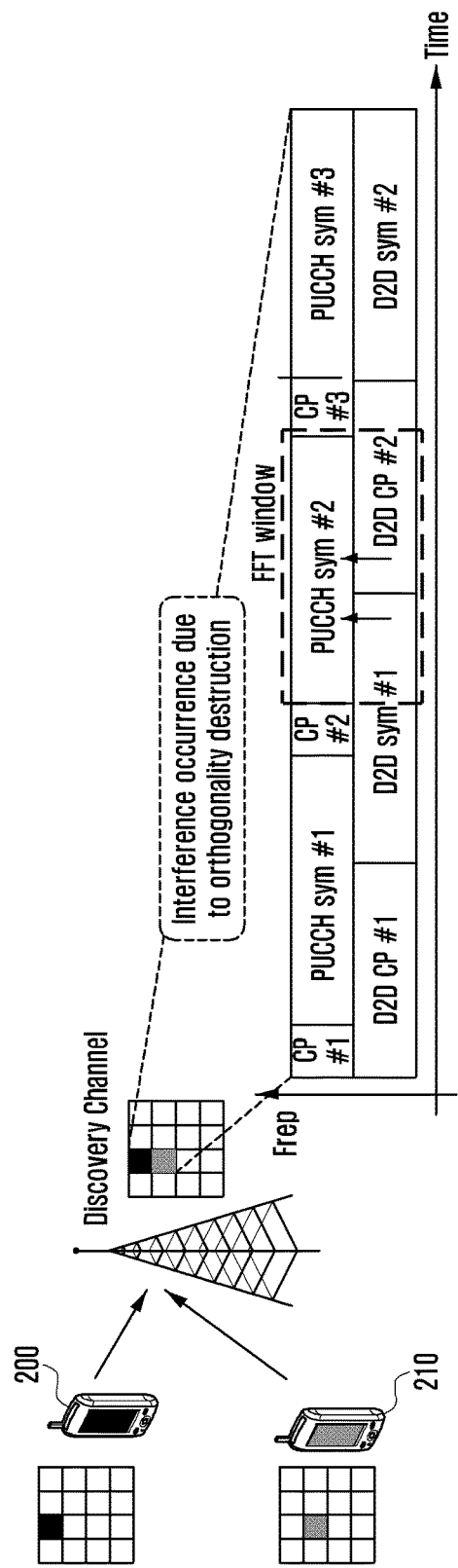
FIG. 2 is a diagram illustrating when interference occurs by discrepancies in cyclic prefix (CP) standards between a CP for a cellular signal and a CP for a D2D discovery signal according to an embodiment of the present disclosure.

FIG. 2 is a diagram illustrating when interference occurs by a mismatch in CP standards between a CP for a cellular signal and a CP for a D2D discovery signal according to an embodiment of the present disclosure.

Referring to FIG. 2, the D2D terminal 210 allocates the D2D discovery channel to D2D uplink bandwidth of the cellular network or an uplink time interval, thereby enabling the D2D discovery channel and cellular PUCCH to coexist. In this case, when the CP standard of the cellular signal and the D2D signal are different from each other, the orthogonality of the D2D discovery signal received through the same sub-frame in the cellular PUCCH signal demodulation process of the base station may not be maintained.

Therefore, when the D2D discovery signal deviating from the CP length standard of the PUCCH is received by the base station, the D2D discovery may cause inter-carrier interference (ICI) to the PUCCH of the cellular terminal 200 such that the orthogonality has been destroyed. That is, the base station configures an effective fast fourier transform (FFT) based on the CP standards applied to the cellular PUCCH signal for demodulation of the cellular PUCCH signal, and the D2D discovery signals with different CP standards that can cause the ICI to the frequency domain after FFT calculation because the orthogonality is not guaranteed within the effective FFT interval configured by the base station.

Figure 3:
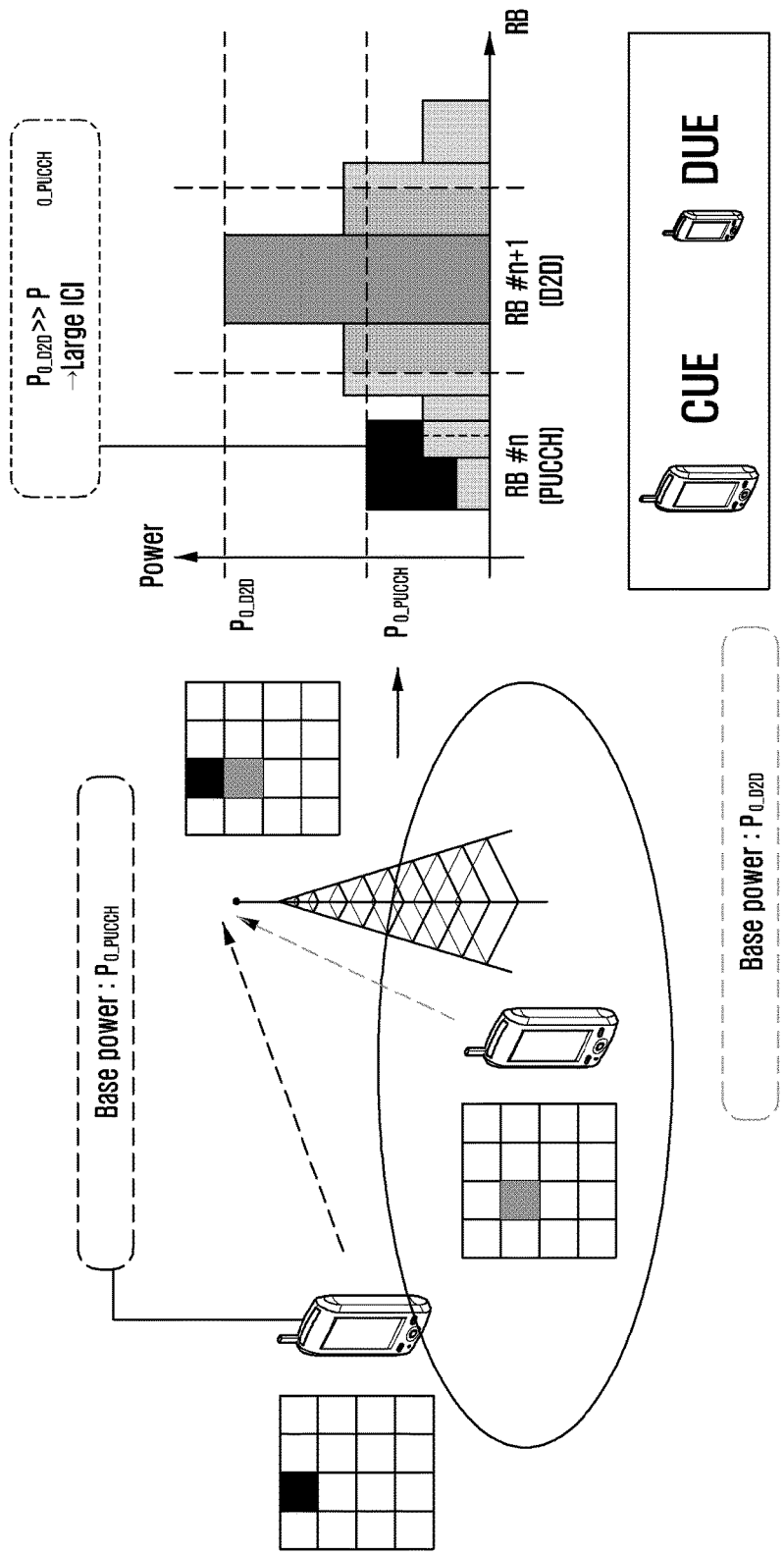
FIGS. 3 and 4 are diagrams illustrating inter-carrier interference (ICI) according to a power control reference value of a D2D discovery signal according to an embodiment of the present disclosure.
Figure 4:
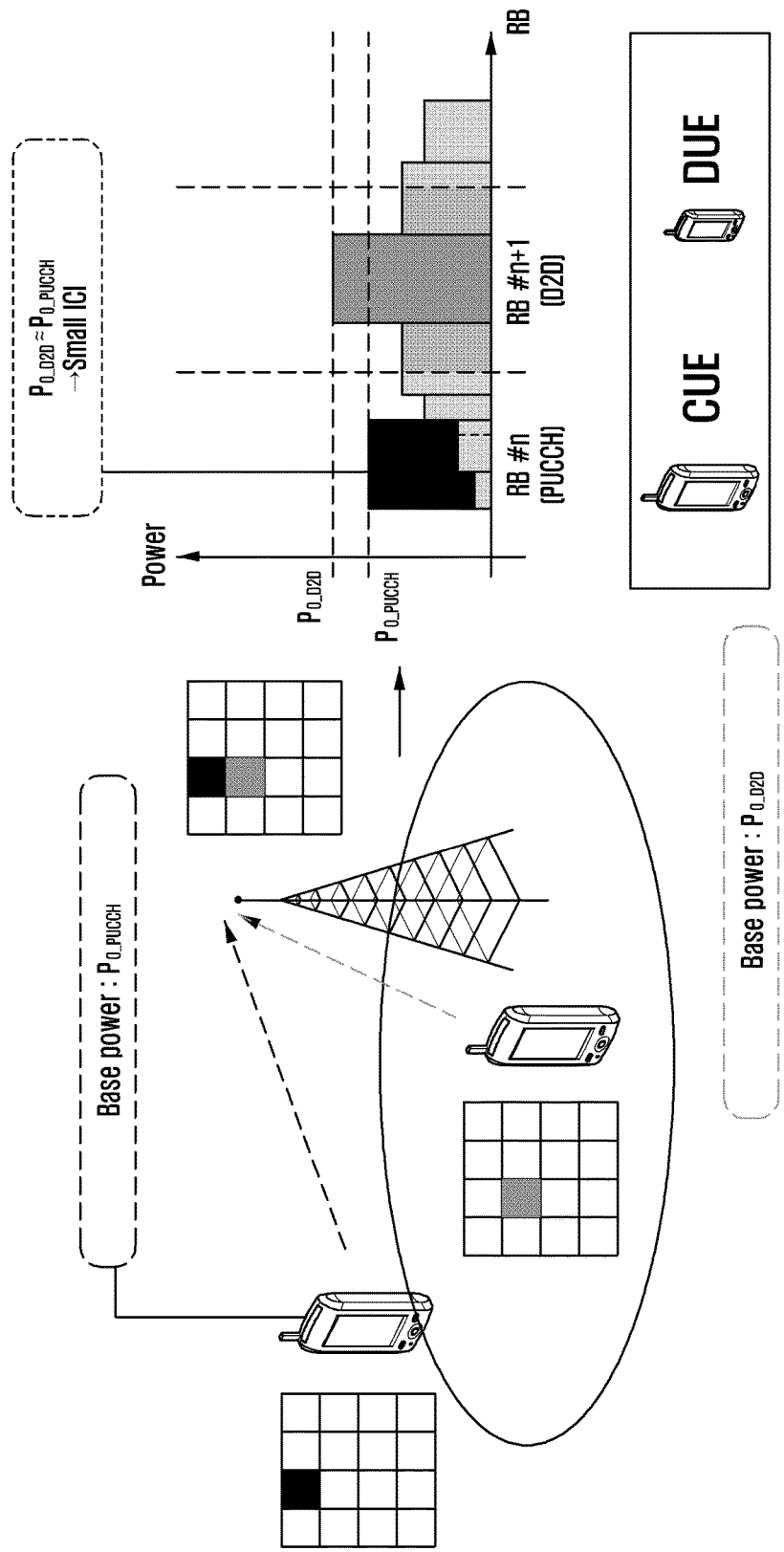

FIGS. 3 and 4 are diagrams illustrating ICI according to a power control reference value of a D2D discovery signal according to an embodiment of the present disclosure.

Referring to FIG. 3, when the reference power $P_{0\_D2D}$ of the D2D discovery signal is larger than a threshold level of the reference power $P_{0\_PUCCH}$ for the cellular PUCCH signal, the reception power of D2D discovery signal of the base station is considerably higher than the reception power of the cellular PUCCH signal. As a result, the cellular PUCCH signal may undergo a substantial amount of received SINR degradation due to the ICI of the D2D discovery signal.

Referring to FIG. 4, when the base station sets a reference power $P_{0\_D2D}$ of the D2D discovery signal to an appropriate level, even if the discovery signal of the D2D is received at the interval outside of the CP length of the PUCCH transmitted by the cellular terminal, an amount of ICI received by the cellular PUCCH signal can be maintained at the constant level or less so that it is possible to guarantee the performance of the cellular system when performing the D2D Discovery.

Figure 5:
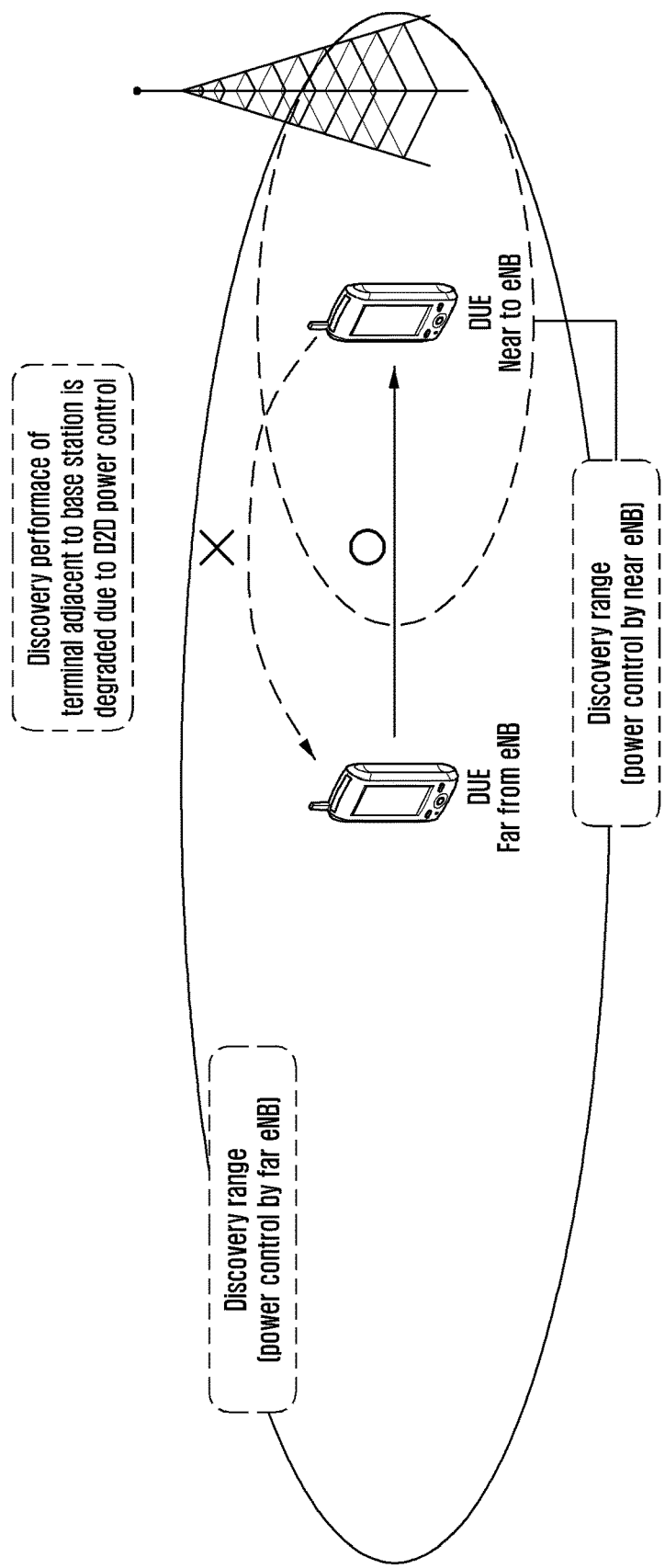
FIG. 5 is a diagram illustrating that the D2D discovery performance decreases due to the power control of a D2D discovery signal according to an embodiment of the present disclosure.

FIG. 5 is a diagram illustrating that the D2D discovery performance decreases due to power control of a D2D discovery signal according to an embodiment of the present disclosure.

Referring to FIG. 5, when applying a power control, such as power control identified in equation 2, to the D2D discovery signal, the closer the distance between the base station-D2D terminals (DUE), the lower the transmission power of the discovery signal is.

Therefore, as illustrated in FIG. 5, the discovery radius of the terminals of the DUEs located in the center of the cell may be very limited compared to the terminals located in the outer region of the cell.

Figure 6:
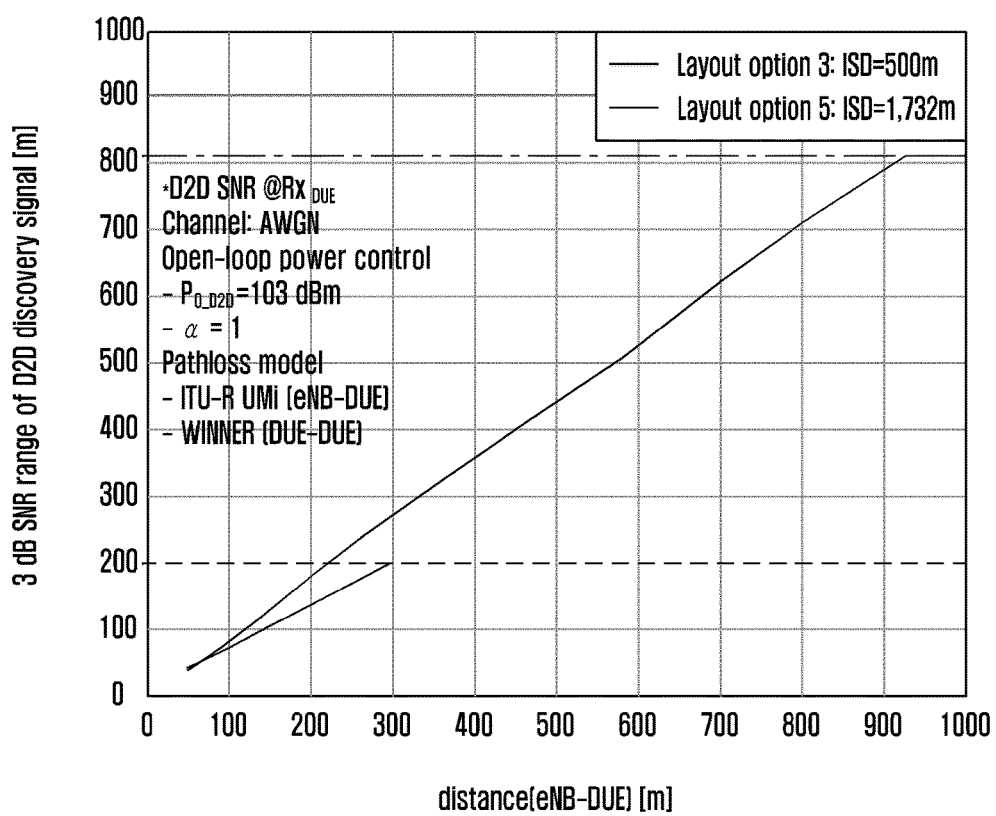
FIG. 6 is a diagram illustrating the distance range of a discovery signal according to the distance between a base station and a D2D terminal according to an embodiment of the present disclosure.

FIG. 6 is a diagram illustrating the distance range of a discovery signal according to the distance between a base station and a D2D terminal according to an embodiment of the present disclosure.

Referring to FIG. 6, experimental results illustrate the terminal discovery radius limitation problems. Specifically, a distance range that a D2D discovery signal transmitted by a corresponding DUE has 3 dB or more reception SNR according to the distance between the base station-DUE, by considering cell layout option 3 (ISD=500 m, out-door environment) and cell layout option 5 (ISD=1,732 m, out-door environment) being considered for D2D terminal discovery performance analysis in the current standardization conference.

As can be seen in FIG. 6, in an environment of ISD=500 m, the distance of the terminal adjacent to the base station at 100 m or less can be received within 70 m having a 3 dB or more SNR, and this means that only a terminal adjacent to a corresponding DUE terminal within 70 m may identify the presence of the corresponding terminal. In addition, in an environment of ISD=500 m, the distance range of the terminal approximately 288 m distanced from the base station of cell outermost point is only 200 m so that it is possible to know that a sufficient discovery radius is not guaranteed. In an environment of ISD=1,732 m, as the distance with the base station is farther than 550 m, the distance range increases to more than 500 m so that the terminal has a relatively broad discovery radius. However, the terminal adjacent to the base station has a greatly reduced discovery radius.

In order to fundamentally improve the discovery radius decreasing problem, a method for amplifying the transmission power of the D2D discovery signal by increasing the reference power $P_{0\_D2D}$ for D2D signal can be considered. However, as mentioned earlier, in order to limit interference affecting the cellular PUCCH signal to an appropriate level, it is impossible to increase the $P_{0\_D2D}$ beyond a certain upper limit for a cellular PUCCH signal and thus the measures for improving the D2D discovery signal performance by increasing the $P_{0\_D2D}$ can have a limitation.

Therefore, in the present specification, when a CP standard between PUCCH/D2D signal is mismatched in the LTE cellular system, a method for performing selective power control for SC-FDMA symbol-specific in the D2D signal is proposed to improve the D2D discovery performance degradation problem when a simple power control for the D2D discovery signal is performed. Specifically, a selective power control technique provided herein may maintain the interference to the cellular PUCCH signal at an appropriate level and increase the average transmission power of the D2D discovery signal, even if the CP standard between PUCCH/D2D signal is mismatched, by considering the orthogonality between two signals is guaranteed in some SC-FDMA symbols and by applying a relatively high transmission power to some of the symbols in the D2D signal to which orthogonality with the PUCCH signal has been maintained.

Figure 7:
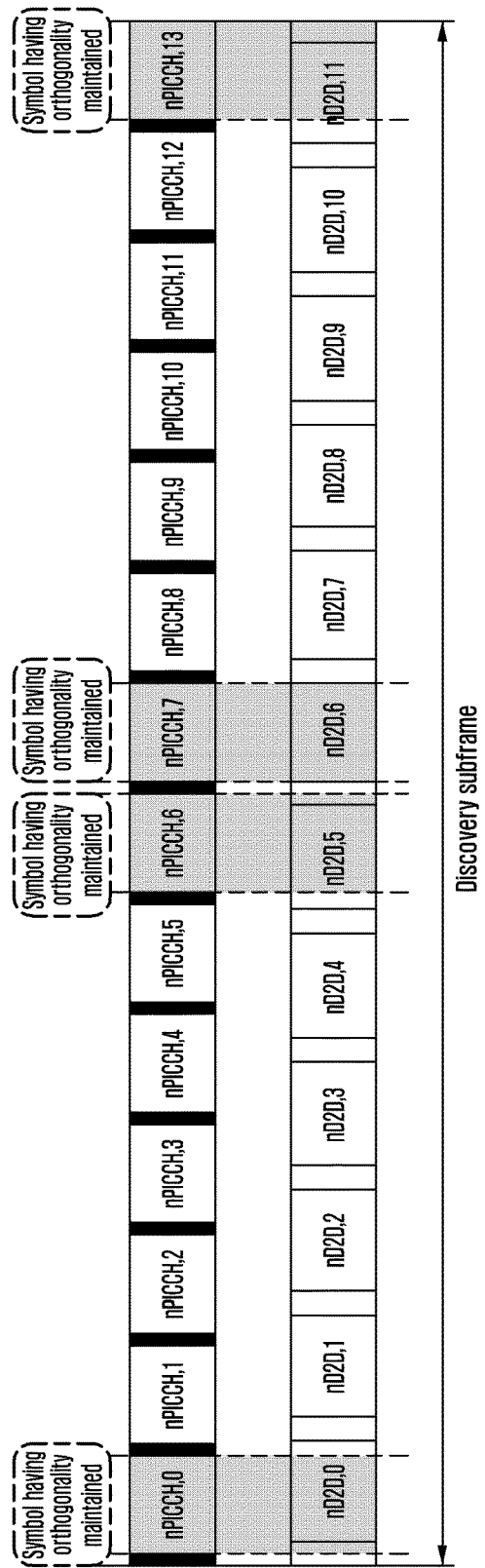
FIG. 7 is a diagram illustrating a symbol position of the D2D discovery signal having orthogonality maintained when a physical uplink control channel (PUCCH) of a cellular terminal and a discovery signal of a D2D terminal use CP different standards according to an embodiment of the present disclosure.

FIG. 7 is a diagram illustrating a symbol position of the D2D discovery signal having orthogonality maintained when a PUCCH of a cellular terminal and a discovery signal of a D2D terminal use different CP standards according to an embodiment of the present disclosure.

Referring to FIG. 7, when the base station receives a PUCCH signal and a D2D signal that have the different CP standards at the same time, even if the reception signal is demodulated by setting effective FFT interval according to the SC-FDMA symbols CP standard of the PUCCH signal to demodulate the PUCCH signal, the signal continuity of some D2D symbols is maintained in a valid FFT interval for demodulating the PUCCH signal, and in the corresponding D2D symbol interval, the ICI does not occur because the orthogonality between the PUCCH signal and the SC-FDMA sub-carriers is maintained.

At this time, the position of the D2D symbol having the orthogonality maintained is not fixed and depends on the distance ($d_{eNB-DUE}$) between the base station and the DUE. In the case of the TYPE-1 method in which the transmission is performed based on the downlink reception time, the D2D discovery signal reaches the base station at a later time than the reference time of the base station and has a different reception time from the cellular PUCCH signal received by being arranged at the reference time of the base station. In this case, if the difference of the reception time is the same as the round trip delay (RTD) ($\tau_{RTD}$) of the D2D signal according to $d_{eNB-DUE}$ and the two types of reception signal times are mismatched according to the difference of the reception time when the reception time difference occurs at a predetermined level or more, the position of the D2D symbol having orthogonality maintained may change. When CP standards of the cellular PUCCH and the D2D discovery signals are normal CP and extended CP, respectively, and if there is no $\tau_{RTD}$ of the D2D signal, the orthogonality is maintained at the positions of the four D2D symbols (Sn={0, 5, 6, 11}, where Sn is SC-FDMA symbol index set in which the orthogonality with the PUCCH signal is maintained).

Figure 8:
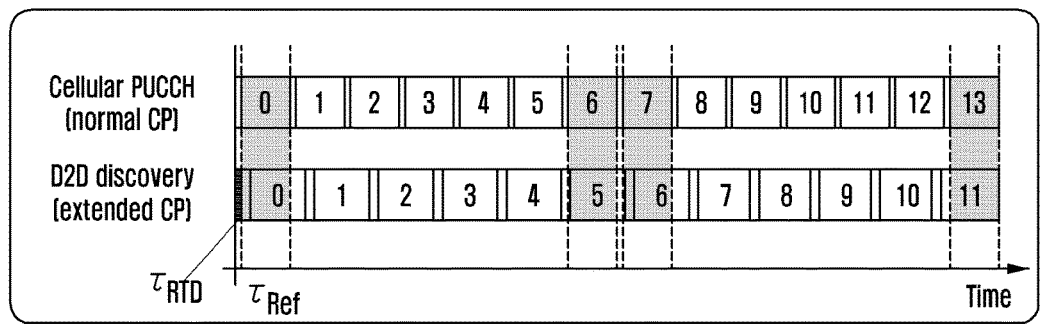
FIG. 8 is a diagram illustrating the position of a symbol having orthogonality maintained when a round trip delay (RTD) of a D2D signal changes according to an embodiment of the present disclosure.
Figure 8:
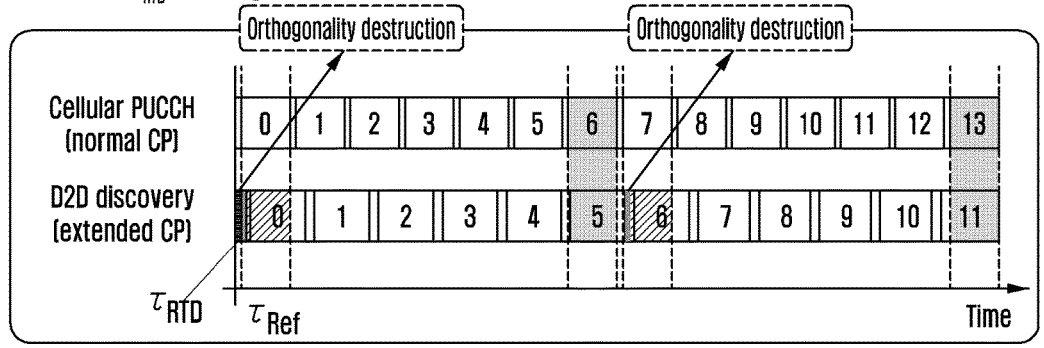

FIG. 8 is a diagram illustrating the position of a symbol having an orthogonality maintained when a RTD of a D2D signal changes according to an embodiment of the present disclosure.

Referring to FIG. 8, when the $\tau_{RTD}$ increases as the DUE is far away from the base station, the base station reception time difference of the PUCCH and D2D discovery signal increases and when the $\tau_{RTD}$ is larger than a certain size, and the position of the D2D symbol having orthogonality maintained may change. The boundary of the orthogonality maintenance symbol position change may be a $\tau_{RTD}$ occurrence point corresponding to 5.21 µs, which is the CP length of a first symbol of each slot of the cellular PUCCH signal. The time delay amount at this time, when considering 10 MHz bandwidth and 1024 FFT size in the LTE cellular system, may correspond to the 80 samples. On the other hand, the distance between the base station and the terminal, in which the $\tau_{RTD}$ may occur, is approximately 781.25 m. Thus, the position of the D2D symbol that has an orthogonality maintained can vary based on $d_{eNB-DUE}$=781.25 m, and the result of organizing the above description is as follows:

TABLE 1

| Case | $\tau_{RTD}$ | $d_{DUE\text{-}eNB}$ | Target D2D symbol |
|---|---|---|---|
| 1 | $\tau_{RTD} \leq 80$ sample | $d_{eNB\text{-}DUE} \leq 781.25$ m | $S_n = \{0, 5, 6, 11\}$ |
| 2 | $\tau_{RTD} > 80$ sample | $d_{eNB\text{-}DUE} \geq 781.25$ m | $S_n = \{5, 11\}$ |

Table 1 illustrates the position of the D2D symbol having orthogonality maintained according to PUCCH/D2D signal reception time difference with a normal or extended CP.

When the $\tau_{RTD}$ is equal to or greater than 184 samples, a new D2D symbol having orthogonality maintained can be generated, and as the $d_{eNB\text{-}DUE}$ for generating the symbol is 1,796 m when applying a power control scheme such as the equation 2, the transmission power of the D2D discovery signal will generally be saturated to $P_{max}$, which is the maximum transmission power of the terminal, and the selective symbol power control becomes meaningless. Therefore, when the CP configuration of the cellular PUCCH signal and D2D discovery signal corresponds to normal CP and extended CP, respectively, the position of the D2D symbol having orthogonality maintained may be limited as illustrated above in Table 1.

Figure 9:
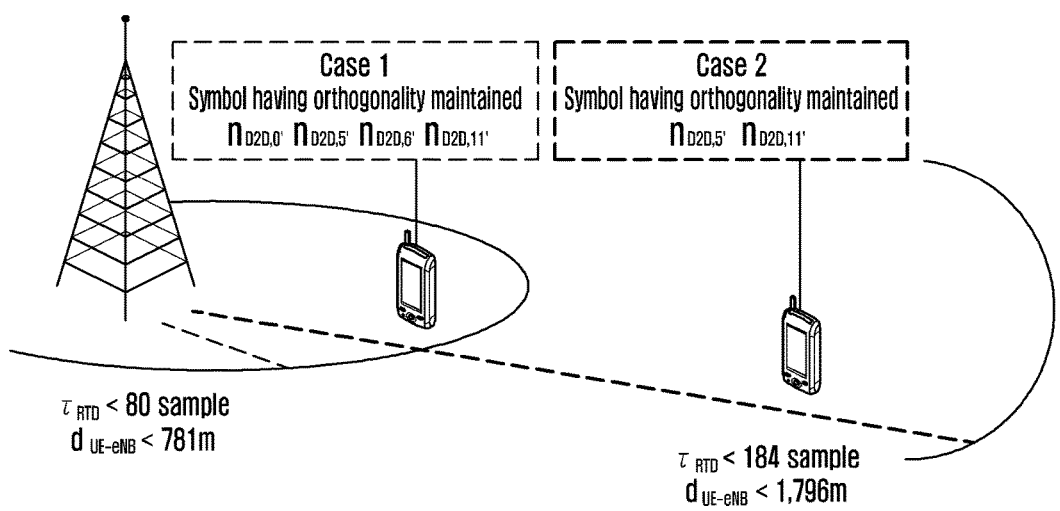
FIG. 9 is a diagram illustrating a change in the position of a symbol having orthogonality maintained when CP standards of a cellular PUCCH signal and a D2D discovery signal corresponds to normal CP and extended CP, respectively according to an embodiment of the present disclosure.

FIG. 9 is a diagram illustrating a change in the position of a symbol having orthogonality maintained when CP standards of a cellular PUCCH signal and a D2D discovery signal corresponds to normal CP and extended CP, respectively according to an embodiment of the present disclosure.

Referring to FIG. 9, as shown in Table 1, when $\tau_{RTD}$ is equal to or less than 80 samples ($d_{eNB\text{-}DUE} \pm 781.25$ m), the symbol index of a D2D discovery signal having orthogonality maintained are {0, 5, 6, and 11}, respectively, and when the $\tau_{RTD}$ is greater than 80 samples and less than 184 samples (781.25 m<$d_{eNB\text{-}DUE}$<1,796 m), the symbol index of the D2D discovery signal are {5, 11}. On the other hand, when the CP standards of the cellular PUCCH signal and the D2D discovery signal correspond to normal CP and extended CP, respectively, the orthogonality (Sn={6, 13}) is maintained at two symbol positions and the boundary of position change of a symbol having orthogonality maintained may be a position at which the $\tau_{RTD}$ corresponds to the CP length (72 sample) of the D2D symbol having orthogonality maintained. The result of organizing the above description is as follows:

TABLE 2

| Case | $\tau_{RTD}$ | $d_{DUE\text{-}eNB}$ | Target D2D symbol |
|---|---|---|---|
| 1 | $\tau_{RTD} \leq 72$ sample | $d_{eNB\text{-}DUE} \leq 703.13$ m | $S_n = \{6, 13\}$ |
| 2 | $\tau_{RTD} > 72$ sample | $d_{eNB\text{-}DUE} > 703.13$ m | — |

Table 2 illustrates the position of the D2D symbol having orthogonality maintained according to PUCCH/D2D signal reception time difference with a normal or extended CP On the other hand, when the CP standards of the cellular PUCCH signal and the D2D discovery signal correspond to normal CP and extended CP, respectively, and when the $\tau_{RTD}$ is equal to or less than 72 samples, the orthogonality is maintained at two symbols (Sn={6, 13}) of the D2D signals. However, when the $\tau_{RTD}$ is greater than 72 samples, the sample having orthogonality maintained disappears. Further, when the $\tau_{RTD}$ is equal to or greater than 176 samples, a new D2D symbol having orthogonality maintained may be generated, however this case is excluded from consideration because the transmission power of the D2D discovery signal is saturated to $P_{max}$. Therefore, when the CP configuration of the cellular PUCCH signal and D2D discovery signal are extended CP and normal CP, respectively, the position of the D2D symbol having orthogonality maintained is limited as illustrated above in table 2.

Further, in the case of type-2B for transmitting the discovery signals at the time to which TA is applied in the same way as the typical cellular signal, because there is no difference in the time to be received by the base station, when the case of the CP configuration of the cellular PUCCH and D2D discovery signals correspond to normal CP and the extended CP, respectively, or when the case of the CP configuration of the cellular PUCCH and D2D discovery signals correspond to extended CP and the normal CP, respectively, $\tau_{RTD}$ is 0, both the Table 1 and Table 2 can have the symbol having orthogonality maintained, which corresponds to the Case 1.

Since the position of the D2D symbol having orthogonality maintained changes according to $\tau_{RTD}$, the DUE must determine the position of the orthogonality maintenance symbol by estimating $\tau_{RTD}$. Thereafter, the power amplification amount of the symbol is determined according to an adapted or a predetermined system parameter, when necessary to support automatic gain control (AGC) operation of the reception D2D terminal, and it is possible to transmit additional information on the transmission power control by allocating the additional information on selective transmission control to some message bits in the discovery signal.

Hereinafter, with reference to FIGS. 10 to 13, a process of determining a D2D symbol having orthogonality maintained, a transmission power determination process, additional information configuration, and a transmission process will be explained in more detail.

Figure 10:
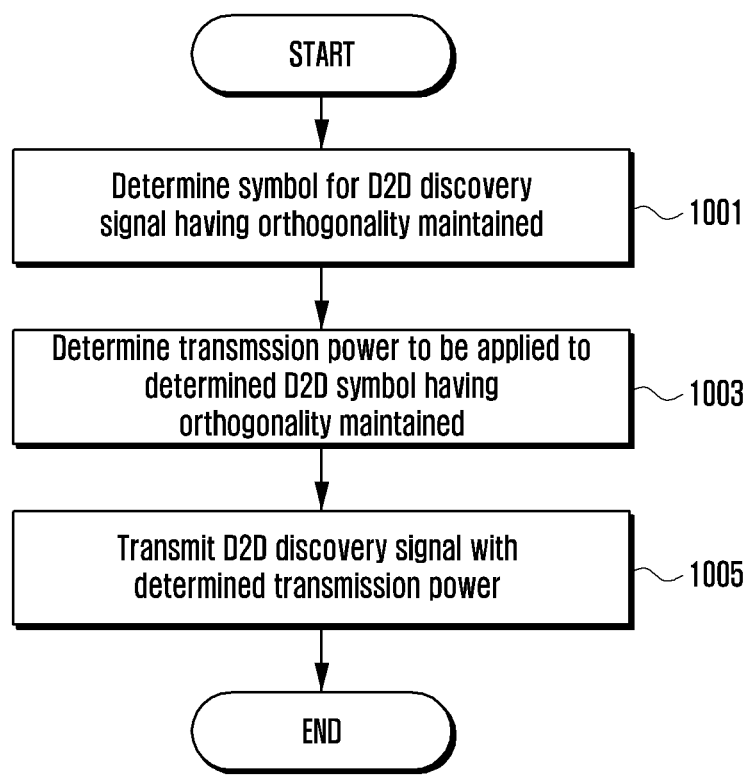
FIG. 10 is a flowchart of a D2D discovery signal transmission method according to an embodiment of the present disclosure.

FIG. 10 is a flowchart of a D2D discovery signal transmission method according to an embodiment of the present disclosure.

Referring to FIG. 10, in operation 1001, a terminal may be determine where a symbol maintaining orthogonality with a PUCCH signal of the cellular terminal is located among respective symbols of the D2D discovery signals.

The process of determining, by the terminal, the position of the D2D symbol having orthogonality maintained will be described in more detail with reference to FIGS. 11A and 11B.

In operation 1003, the terminal may determine the amplified transmission power of the symbols having orthogonality maintained.

A method of determining the transmission power amplification value of the symbol having orthogonality maintained will be described in more detail with reference to FIG. 12.

In operation 1005, the terminal may transmit the D2D discovery signals with the determined transmission power.

Figure 11A:
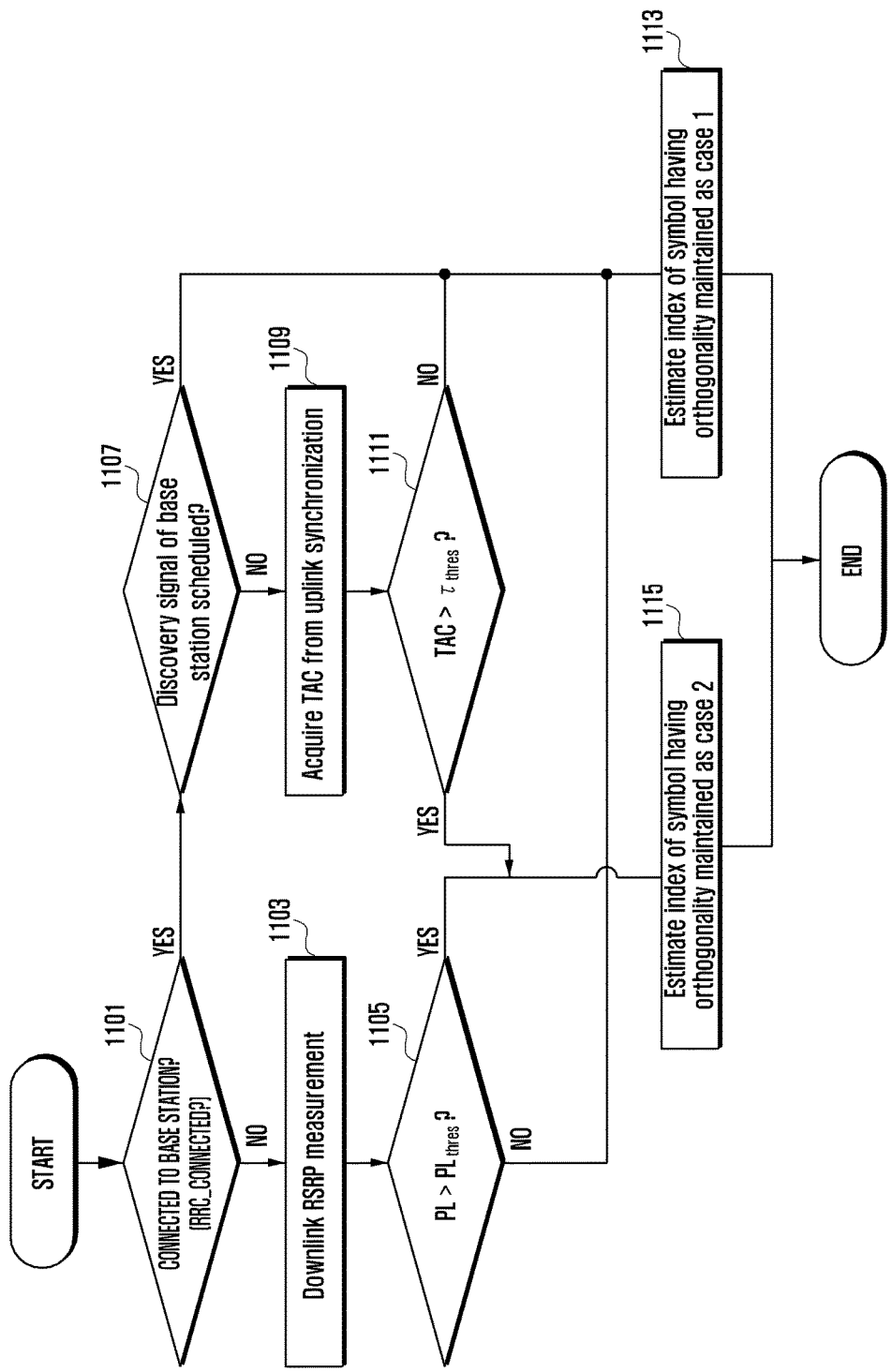
FIGS. 11A and 11B are flowcharts illustrating methods of determining the symbol having the orthogonality according to an embodiment of the present disclosure.
Figure 11B:
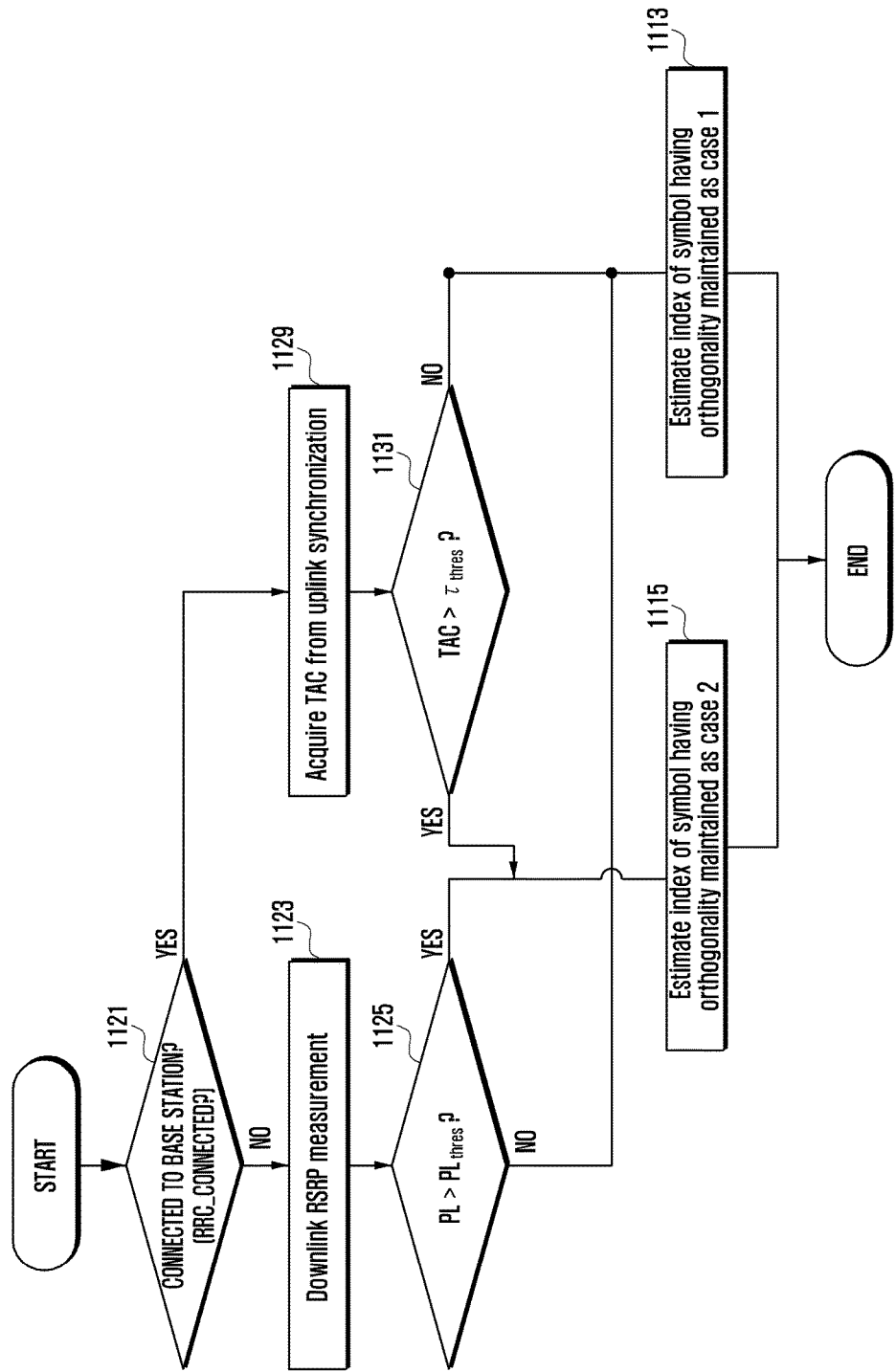

FIGS. 11A and 11B are flowcharts illustrating methods of determining the symbol having orthogonality according to an embodiment of the present disclosure.

More specifically, FIGS. 11A and 11B are diagrams for explaining the operation of different embodiments to determine a symbol having orthogonality maintained.

Referring to FIG. 11A, in operation 1101, the terminal may determine whether the terminal is connected to the base station. Here, the expression that the state where the terminal is connected to the base station may mean a RRC_CONNECTED state.

When the terminal is not a connected to the base station, that is, when in a case of a RRC_IDLE state, the terminal must estimate $\tau_{RTD}$ and determine the position of the D2D symbol having orthogonality maintained. In other words, the terminal of the RRC_IDLE state may not receive information associated with the $\tau_{RTD}$ from the base station and may periodically receive only a downlink signal of the base station.

The terminal may measure RSRP of the downlink signal of the base station and approximately estimate the $\tau_{RTD}$ from the measured power. Particularly, in operation 1103, the terminal in the RRC_IDLE state measures the RSRP from the downlink signal of the base station to perform a power control as disclosed in equation 2, and estimates path loss (PL) along the path between a base station and a terminal. At this time, since the PL is proportional to $\tau_{RTD}$, it is possible to approximately estimate the $\tau_{RTD}$ through the PL.

Here, the base station downlink signal path loss ($PL_{thres}$) at the boundary point where the position of the D2D symbol having orthogonality maintained changes can be utilized as the position determination criterion of the D2D symbol having orthogonality maintained. The terminal may determine whether its location belongs to the boundary points or deviates away from the boundary points through a comparison of the PL measured through the RSRP of the downlink reception signal and $PL_{thres}$ of the boundary points, through which the positions of the D2D symbols having orthogonality maintained may be determined by their own, and the result of organizing the above description as follows:

TABLE 3

| | | Target symbol | |
|---|---|---|---|
| Case | Criteria | Normal/extended CP | Extended/normal CP |
| 1 | $PL \leq PL_{thres}$ | $S_n = \{0, 5, 6, 11\}$ | $S_n = \{6, 13\}$ |
| 2 | $PL > PL_{thres}$ | $S_n = \{5, 11\}$ | — |

<As such, table 3 identifies the position of the D2D symbols having orthogonality maintained by comparing the estimated path loss values.

When the CP standard of the PUCCH/D2D signal is normal CP or extended CP, the $PL_{thres}$ is a path loss value at $d_{eNB-DUE}$=781.25 m, and when the CP standard is extended CP/normal CP, the $PL_{thres}$ is a path loss value at $d_{eNB-DUE}$=703.13 m. The $PL_{thres}$ at the point can be obtained based on the preliminary measurement or system path loss model. For example, when using the path loss model in an urban micro cell channel model, the CP standard of the cellular PUCCH signal and the D2D discovery signal are normal CP and the extended CP, respectively, an average $PL_{thres}$, which corresponds to 123.06 dB, may be obtained. After measuring the RSRP, in operation 1105, the terminal determines the position of the symbol having orthogonality maintained as shown in Table 3 by comparing the measured PL through the derived $PL_{thres}$=123.06 dB and the downlink signal RSRP. Or the advance path loss values is measured through a field measurement and a proper $PL_{thres}$ value can be configured by a system parameter, and, in this case, the terminal can perform the above procedure by considering the pre-acquired $PL_{thres}$ value. Specifically, when the CP standard of the cellular PUCCH signal and D2D discovery signals are normal CP and extended CP, respectively, the specific D2D symbols (Sn={5,11}) always maintain the orthogonality in a cellular environment under consideration. Therefore, only in the case of the normal CP or extended CP, a method of selecting only the two symbols is possible to use the additional power without the process for discovering the position of the D2D symbols having orthogonality maintained. In this case, a fixed D2D symbol having orthogonality maintained is used and the procedure to discover the D2D symbol having orthogonality maintained can be omitted, and the proposed method can be easily implemented.

In operation 1105, when the PL between a base station and a terminal is equal to or less than the bases station downlink signal path loss ($PL_{thres}$) at the boundary point where the position of the D2D symbol having orthogonality maintained changes, $\tau_{RTD}$ is less than the threshold value, and thus it is possible to estimate that the D2D symbol index having orthogonality maintained corresponds to the Case 1 at operation 1113.

Referring back to operation 1105, when the PL between the base station and the terminal is greater than the bases station downlink signal path loss ($PL_{thres}$) at the boundary point where the position of the D2D symbol having orthogonality maintained changes, the $\tau_{RTD}$ is greater than the threshold value, and it is possible to estimate that the D2D symbol index having orthogonality maintained corresponds to the Case 2 at operation 1115.

Referring back to operation 1101, when the terminal is connected to a base station, that is, the RRC_CONNECTED state, the process proceeds to the operation 1107 and it is determined whether the discovery signal of the D2D terminal is scheduled by the base station.

If the base station is not scheduling the discovery signal of the D2D terminal and the discovery resource is arbitrarily selected by the terminal, it can be seen that a discovery resource is allocated by the Type-1 method.

When the terminal is in a RRC_CONNECTED state that performs the uplink synchronous with the base station and the base station is scheduling the discovery signal, the terminal may acquire a timing advanced command (TAC) in the course of performing uplink synchronization in operation 1109. The terminal may identify the position of the D2D symbol having orthogonality maintained through the TAC. The TAC used to control the downlink reference time as the uplink reference time has the same value as $\tau_{RTD}$ according to the distance between the base station and DUE, through which the terminal may identify its positions in the cells. In operation 1111, the terminal may identify, as shown in Table 1 and Table 2, the position of the D2D symbol having orthogonality maintained by comparing $\tau_{RTD}$ value, which is of a boundary point where the position of D2D symbol having orthogonality maintained changes, and the TAC.

Specifically, as a result of comparing the TAC and $\tau_{RTD}$ value of a boundary point where the position of D2D symbol having orthogonality maintained changes, when the TAC is larger than the $\tau_{RTD}$ value, the $\tau_{RTD}$ value is greater than the threshold point and the symbol index having orthogonality maintained can be estimated as Case 2 in operation 1115.

On the contrary, when the $\tau_{thres}$ value is less than TAC, the $\tau_{RTD}$ value is smaller than the threshold point and thus the symbol index having orthogonality maintained can be estimated as Case 1 in operation 1113.

Referring back to operation 1107, as a result of the determination, when the base station directly schedules the discovery signal of the D2D terminal, discovery resources are allocated using the Type-2B discovery method. The Type-1 discovery Irrespective is a method of transmitting D2D discovery signal at the downlink reference time regardless of whether to connect the base station, and the Type-2B discovery can transmit the D2D discovery signal at the uplink reference time. In this case, the synchronization time of the Type-2B discovery signal is matched with a cellular PUCCH signal and the reception time difference does not exist between the D2D discovery signal received by the base station and the cellular PUCCH signal. As such, the position of the D2D symbol having orthogonality maintained is always fixed and, therefore, $\tau_{RTD}=0$ in Table 1 and Table 2. That is, D2D symbol index having orthogonality maintained can be estimated as in Case 1.

Thus, the method disclosed in FIG. 11A is to determine a symbol having orthogonality maintained, regardless of the entity for scheduling the discovery signals of the D2D terminal.

Referring to FIG. 11B, the operations of operation 1121 to operation 1125 by the terminal may operate in a similar manner as operation 1101 to operation 1105. In this case, the Type-2B discovery method scheduling the discovery signal of the D2D terminal by the base station can transmit the D2D discovery signal at the downlink reference time which corresponds to the frame reception time of the terminal, like the Type-1 discovery method directly scheduling the discovery signal of the D2D terminal by the terminal. That is, the terminal, regardless of the entity for scheduling discovery signals, transmits D2D discovery signals at all the downlink reference times, and the TAC, which adjusts the downlink reference time to the uplink reference time, is the same value as $\tau_{RTD}$ according to the distance between the base station and DUE, whereby the terminal may identify its location in the cell and can be used to determine the symbol.

Therefore, in operation 1121, when the terminal is connected to the base station, regardless of the entity for scheduling the discovery signals, the process proceeds to operation 1129 where TAC is acquired in the process of the uplink synchronization with the base station and then an operation of determining the symbol may be performed. The operations after the operation 1131 are the same as the operations after the operation 1111 of FIG. 11A.

Figure 12:
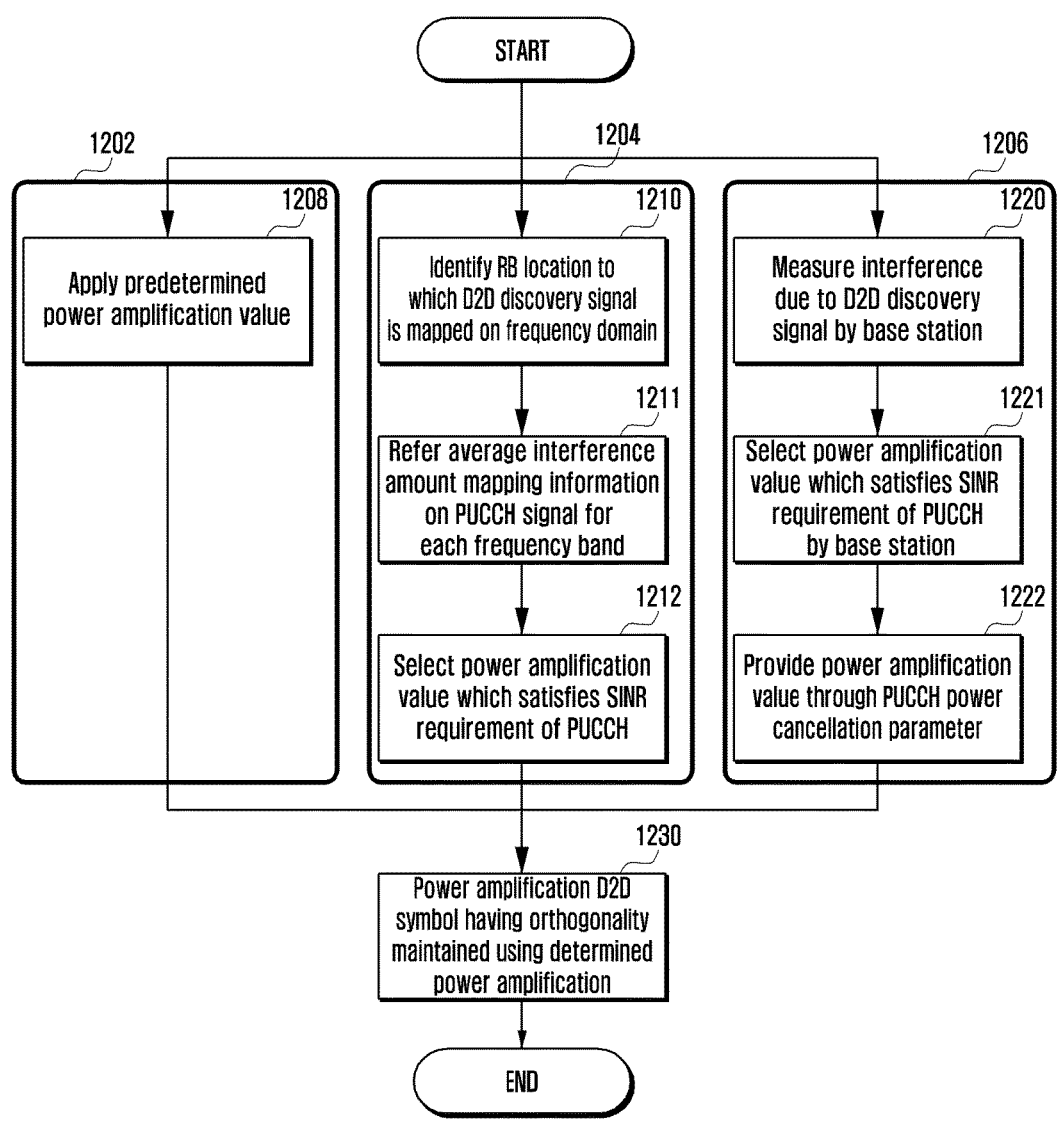
FIG. 12 is a diagram illustrating various methods for determining the amplified transmission power of the symbol having orthogonality maintained in a D2D discovery signal transmission method according to an embodiment of the present disclosure.

FIG. 12 is a diagram illustrating various methods for determining amplified transmission power of the symbol having orthogonality maintained in a D2D discovery signal transmission method according to an embodiment of the present disclosure.

Referring to FIG. 12, the terminal may determine the transmission power of the D2D signal using a power control technique disclosed in equation 2. Further, a selectively higher power can be applied to D2D symbols having orthogonality maintained in embodiments of the present disclosure. The nth symbol transmission power $P_{D2D,n}$ of the D2D discovery signal determined using these steps can be defined by Equation 3 as follows:

Equation 3

$$P_{D2D,n} = \begin{cases} \min\left\{ P_{max}, \begin{array}{l} 10\log_{10}(M_{D2D}) + P_{0\_D2D} + \\ \alpha_{D2D} \cdot PL + \Delta_{MCS} + f_{D2D} \end{array} \right\}, & \text{when } n \notin S_n, \\ \min\left\{ P_{max}, \begin{array}{l} 10\log_{10}(M_{D2D}) + P_{0\_D2D} + \\ \alpha_{D2D} \cdot PL + \Delta_{MCS} + f_{D2D} + \Delta_{boost} \end{array} \right\}, & \text{when } n \in S_n. \end{cases}$$

Here, $\Delta_{boost}$ is the power amplification value of the D2D symbol having orthogonality maintained.

In the following, an applicable method for the determination of the $\Delta_{boost}$ value will be described in detail using FIG. 12.

The power amplification value of the D2D symbol having orthogonality may be determined by any one of the methods 1202, 1204, and 1206.

In particular, the first method 1202 amplifies the symbol in operation 1208 using a predefined $\Delta_{boost}$ value without a separate procedure for power amplification of the D2D symbol having orthogonality maintained. The $\Delta_{boost}$ value is held in advance, by all terminals, as the fixed value or can be regularly received over the system information block (SIB) transmission of the base station, and the $\Delta_{boost}$ value may be determined at a level which satisfies the minimum SINR requirement of the cellular PUCCH signal through a field measurement (typically, a probability of —7.8 dB or more SINR is being required to be 95% or more).

The second method 1204 adaptively determines the $\Delta_{boost}$ value 1210 by the terminal based on the position of the frequency domain RB.

Each terminal determines a $\Delta_{boost}$ value based on the frequency domain position of the terminal itself by considering the size of the interference to the cellular PUCCH is different according to the allocation position of the frequency domain of the D2D discovery signals. That is, with each D2D terminal, when the discovery signal transmission band of the D2D terminal is close to the cellular PUCCH signal band located at both ends in the frequency domain, the D2D terminal may use a low $\Delta_{boost}$ value to limit the interference to the cellular PUCCH signal by their discovery signal transmission. When their discovery signal transmission band has sufficient space with the cellular PUCCH signal in the frequency domain, each of the D2D terminals may apply the high $\Delta_{boost}$ value to ensure their discovery radius. To this end, the terminal can identify the location of the RB that has the D2D discovery signals on the frequency band mapped in operation 1210.

Meanwhile, a pre-analysis for average interference amount inducing in the cellular PUCCH signal band must be preceded depending on the position of the discovery signals of each frequency domain, through which the average interference amount for each position of the discovery signals of a frequency domain and the mapped information (look-up table) on the $\Delta_{boost}$ values should be provided in advance to the terminal. The terminal includes a table that has been mapped with the average interference amount based on the positions of the discovery signals of each frequency domain, or the terminal may receive the table via a regular transmission of the SIB information of the base station. When identifying the position of the RB to which the D2D discovery signal is mapped, the terminal may reference, in operation 1211, an average interference amount mapped to the RB, and may select a power amplifier value within a range among the reference average interference amount which satisfies the minimum SINR requirement (typically the probability likely to have an SINR of —7.8 dB or more is required to be over 95%) of the cellular PUCCH signal in operation 1212.

A third method 1206 of determining the $\Delta_{boost}$ value based on the control of the base station, not a terminal, will be described. The method is to provide, by the base station, the $\Delta_{boost}$ value to only terminals in RRC_CONNECTED states, while the terminal performs the power control depending on the location of the discovery signals on the frequency domain in the same principle as the method 1204 for adaptively determining $\Delta_{boost}$ value based on the location of the frequency domain RB. In particular, in operation 1220, the base station measures the interference on the D2D discovery signals, and the base station may determine a power amplification value within the range that the interference amount measured at operation 1221 that satisfies the SINR requirements of the PUCCH. As described above, $\Delta_{MCS}$ and $f_{C\_D2D}$ values may not be used in a power control process for the D2D discovery signal, and in this case, the base station may provide the $\Delta_{boost}$ value to each of the terminals utilizing the upper layer signaling mechanism in operation 1222 to provide the $\Delta_{MCS}$ and $f_{C\_D2D}$ values for each of the terminals. In this case, the $\Delta_{MCS}$ and $f_{C\_D2D}$ values provided for signal transmission in a D2D discovery channel may be recognized by each of the terminals as the $\Delta_{boost}$ value and thus may only perform a limited power amplification to a symbol having orthogonality maintained.

The power difference can be generated between the D2D symbols arranged on the sub-frame according to the selective transmission power determination method described above. A reception D2D terminal (Rx-DUE) receiving the D2D signal performs AGC scaling of the signal within the operating range of the analog-to-digital converter (ADC) by receiving the D2D signal that has a difference in power. The signal having a significant power difference requires a relatively long time to perform the AGC operation, and when the AGC operation is not completed before the start of a valid FFT interval for signal demodulation, since the quantization error is severe in the process of ADC, a high-speed AGC operation is required. Therefore, the scheme including information to support an AGC operation in the D2D discovery signals can be considered to support an AGC operation of the D2D terminal receiving D2D discovery signals to which selective power control is applied according to the present disclosure.

Figure 13:
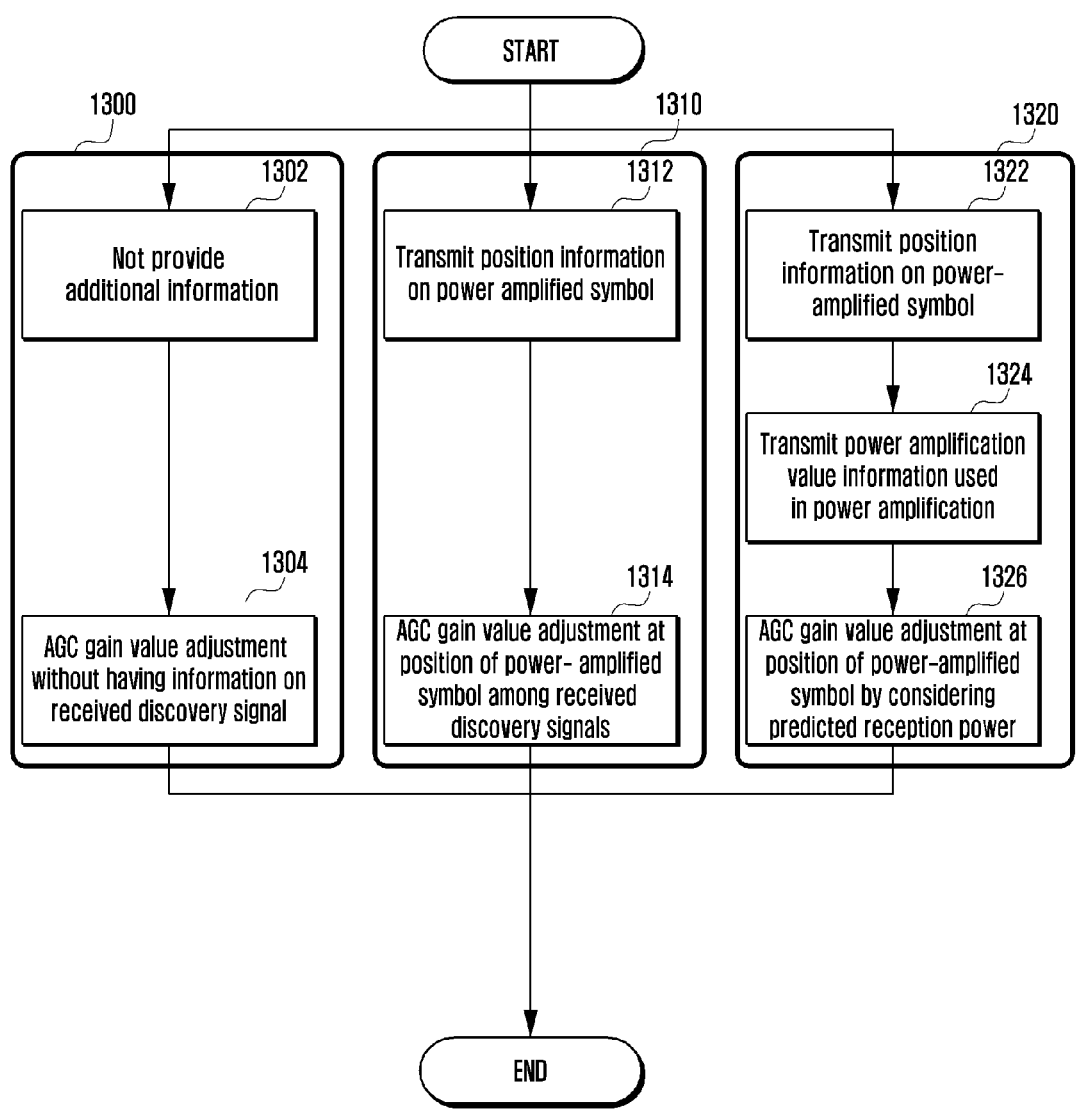
FIG. 13 is a diagram illustrating various methods for providing information to support an automatic gain control (AGC) operation of a terminal for receiving a D2D discovery signals transmitted according to an embodiment of the present disclosure.

FIG. 13 is a diagram illustrating various methods for providing information to support an AGC operation of a terminal for receiving a D2D discovery signals transmitted according to an embodiment the present disclosure.

Referring to FIG. 13, methods 1300, 1310, and 1320 can be considered, depending on whether to support an AGC operation of the D2D terminal receiving the D2D discovery signals to which the selective power control is applied.

Referring to FIG. 13, the method 1300 relates to a case where the reception D2D terminal does not support the AGC operation and does not provide additional information in operation 1302. When the AGC operation is able to complete before the start of the effective FFT interval, the additional information for the AGC operation may be unnecessary overhead and, when sufficient AGC operation time is already guaranteed, the additional information may not be provided. In particular, when the D2D discovery signals apply the extended CP standard, the CP length is sufficiently long and the length of the guard interval that may be utilized to adjust the AGC gain value in operation 1304 before the start of effective FFT interval. Thus, even in the case of adjusting the AGC gain value of the symbol unit, it is possible to expect a relatively stable operation.

Second, a second method 1310 provides position information of a symbol on which power amplification on the discovery signals is performed in operation 1312. The reception terminal can significantly increase the operating range of the AGC at the location of the symbol and speed up the convergence of the AGC by providing location information of the symbol having the power amplified among the sub-frames of the D2D signal. Thus, in operation 1314, AGC value adjustment is performed at the position of the power=amplified symbol among the received discovery signals. The information amount that is required in the relevant information is about 1-2 bits and may be implemented to provide whether the information amount corresponds to any one among the case 1 and case 2 as described above with reference to Table 1 and Table 2.

A third method 1320 may provide both the location and the $\Delta_{boost}$ value of a symbol on which power amplification is performed. As such, in operation 1322, the position information on the power-amplified symbol is transmitted. In operation 1324, the power amplification value used in the power amplification is transmitted. In operation 1326, the AGC value adjustment is performed at the position of the power-amplified symbol by considering the predicted reception power. The method 1320 supports faster AGC convergence by providing the location of the symbol having the power amplified performed among the sub-frames of the D2D signal and the $\Delta_{boost}$ values applied by the D2D signal. In this case, there is a disadvantage in that necessary information amount increases because a $\Delta_{boost}$ value is quantified and provided along with the position information on about 1-2 bits power amplifier application symbols. However, the method 1320 has the advantage that the reception D2D terminal can predict reception power for each symbol by synthesizing the information and quickly adjust the AGC gain value.

FIGS. 14, 15, 16, and 17 are diagrams showing cumulative distribution function (CCDF) curves of the PUCCH reception signal to interference plus noise power ratio (SINR) performance and D2D reception SINR performance according to an embodiment of the present disclosure.

Referring to FIGS. 14, 15, 16, and 17, the effects of the selected transmission power control method of the D2D discovery signals according to the present disclosure will be described. Specifically, the effect of selective transmission power determination technique on the D2D discovery signals provided through the simulations will be described. The purpose of the present disclosure is to amplify the D2D signal power to improve the D2D discovery performance as well as not to significantly generate an additional interference on the PUCCH signals and thereby the effectiveness of the proposed method can be identified via the simulation performance evaluation as follows.

1) Compare SINR performance of the base station received PUCCH signal between the prior art/proposed method.

2) Compare SINR performance of the DUE received D2D discovery signal between the prior art/proposed method.

At this time, the other methods apply the power control of the equation 2 to the D2D discovery signals. The PUCCH received signal SINR performance and D2D received signal SINR performance according to the conventional method and the proposed method are indicated by the complementary cumulative distribution function (CCDF) and performed a comparative analysis, respectively.

Effects are those measured by the following conditions. Firstly, a hexagonal cell model is assumed and then is placed in 1-Tier cell model in the form of six cells enclosing around the center cell. The base station is located in the center of each cell, and ISD is set to be in 500 m or 1,732 m. Each cell is sectored internally in 120° units, and 25 CUEs and 125 DUEs, that is, a total of 150 terminals are arbitrarily placed in each sector. The distance between the discovery signal transmission terminal and the receiving terminal is arranged to have a minimum 3 m, and all terminals are arranged to have a distance of at least 35 m distance from the cell base stations, respectively.

The discovery channel of the terminal has a structure described above with reference to FIG. 1, and the discovery signal is configured by one PRB. The discovery signal is configured by quadrature phase shift keying (QPSK) modulated SC-FDMA symbols. In order to determine the transmission power of the PUCCH signal and D2D discovery signals that are allocated to the discovery channels, the power control techniques of the equation 1 and equation 2 are applied to CUE and DUE, respectively.

Figure 14:
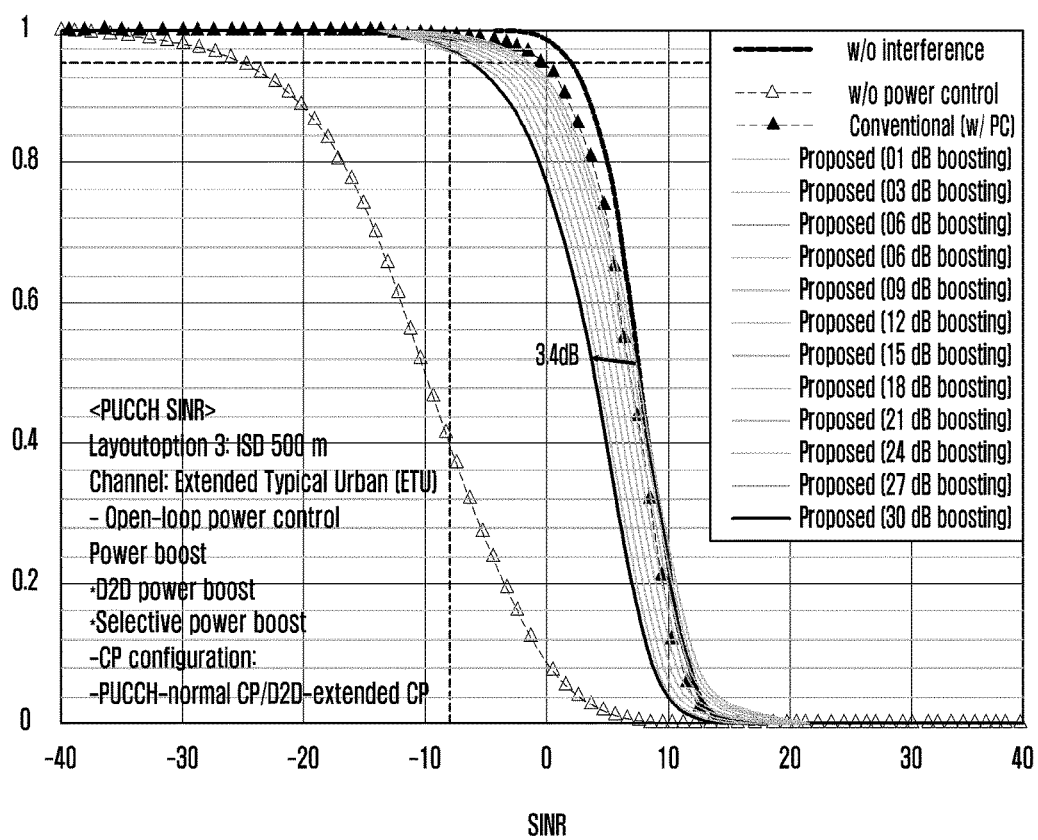
FIGS. 14, 15, 16, and 17 are diagrams showing cumulative distribution function (CCDF) curves of the PUCCH reception signal to interference plus noise power ratio (SINR) performance and D2D reception SINR performance according to an embodiment of the present disclosure.
Figure 15:
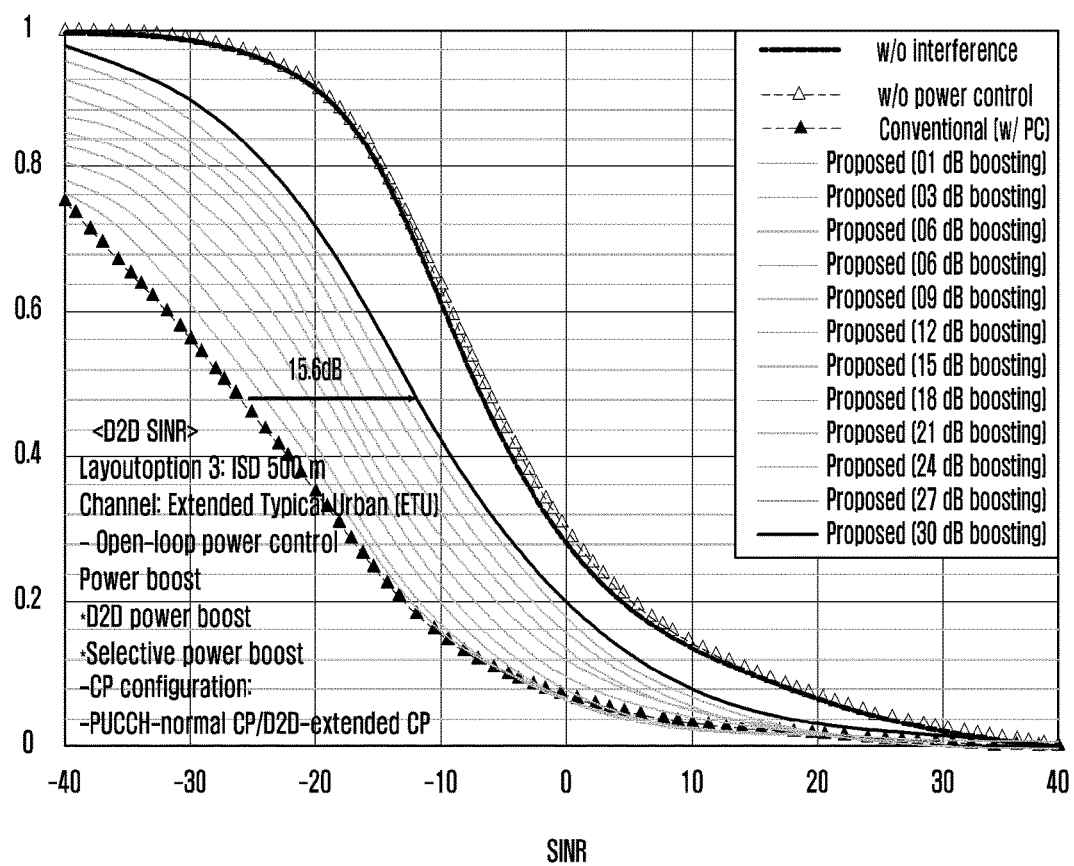
Figure 16:
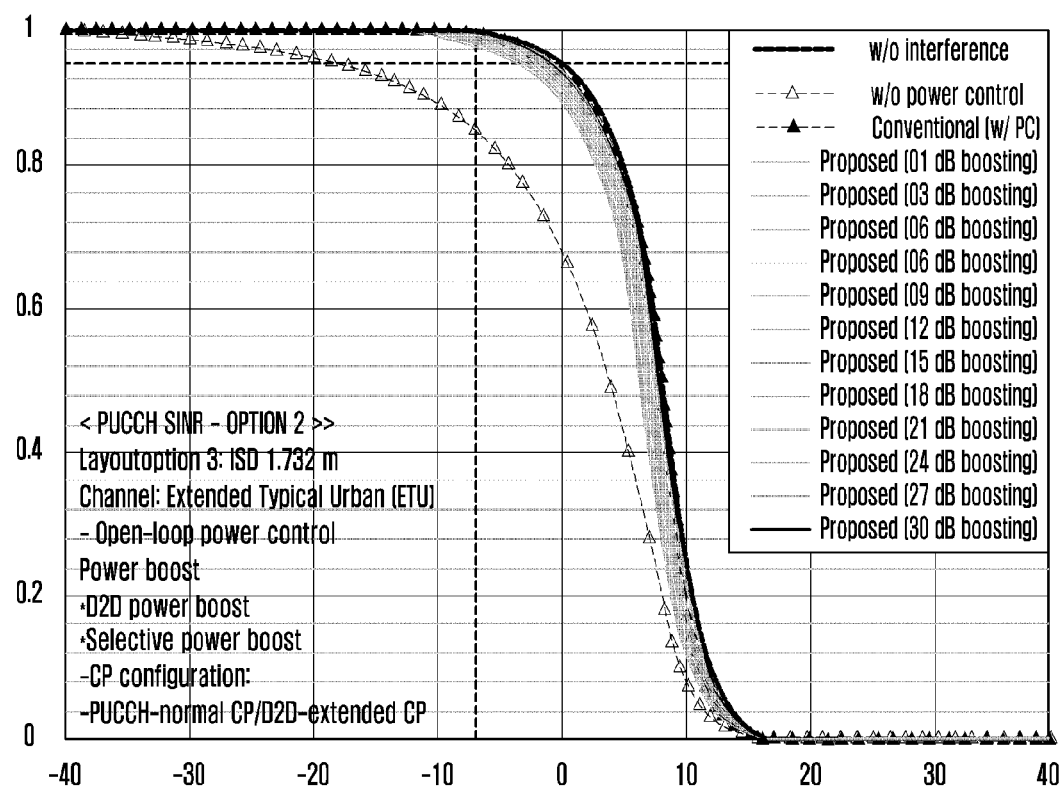
Figure 17:
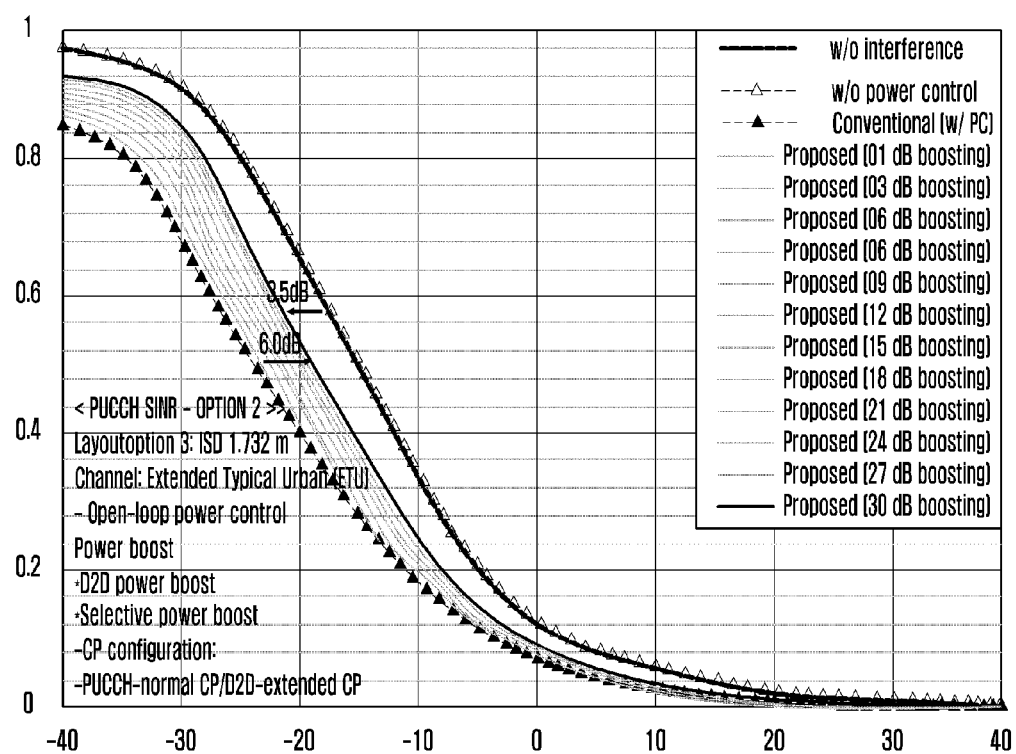

When applying the proposed method of the present disclosure, to determine the D2D symbols having orthogonality maintained, it is assumed that each terminal can accurately estimate its RTD value, and thus the position of a symbol having orthogonality maintained is accurately determined. Further, a method of determining the power amplification value applies a method of amplifying power by a pre-defined value for the D2D symbol having orthogonality maintained, by considering the method of providing the $\Delta_{boost}$ value as a system parameter as described above with reference to FIG. 12. At this time, the parameter $\Delta_{boost}$ amplifying for selective power of the orthogonality maintaining terminal was observed while varying from 0 dB to 30 dB. Referring to FIGS. 14 and 15, the CCDF curve of the PUCCH reception SINR performance and D2D reception SINR performance at the time of applying the proposed method to the D2D signal in an ISD 500 m environment is illustrated. The PUCCH reception SINR performance shows a tendency to slightly degrade by the application of the selective power control of the D2D discovery signal, and shows about 3.4 dB degraded performance when amplified by 30 dB. On the other hand, the D2D reception SINR performance shows a significant performance improvement by applying the power amplification, and shows an improvement of about 15.6 dB when amplified by the 30 dB. As a result, it is identified that a very large D2D reception performance gain can be obtained by adding less PUCCH interference through the application of the proposed method in an ISD=500 m environment. Referring to FIGS. 16 and 17, the CCDF curve of PUCCH reception SINR performance and D2D reception SINR performance when applying the proposed method to a D2D signal in an ISD 1,732 m environment is illustrated. The PUCCH reception SINR performance is hardly degraded and the performance is maintained, and performance is degraded by about 0.8 dB even when amplified by 30 dB. On the other hand, the D2D reception SINR performance shows a performance improvement by applying the power amplification, and shows performance improvement of about 6.0 dB when amplified by 30 dB. As a result, through the application in the ISD=1,732 m environments, a greater D2D reception performance gain can be obtained while adding very little interference to a PUCCH.

The parameters used in the simulations related to FIGS. 14, 15, 16, and 17 are provided in Table 4.

TABLE 4

| Parameter | Value |
| --- | --- |
| # of UE | 150/cell |
| # of RRC_CONNECTED UE | 25/sector |
| # of RRC_IDLE UE | 125/sector |
| Cell structure | 1-tier (7 hexagonal cell) |
| ISD | 500/1,732 m |
| Bandwidth | 10 MHz |
| Carrier frequency | 2 GHz (ISD 500 m)/700 MHz (ISD 1,732 m) |
| FFT (Fast Fourier Transform) size | 1024 |
| CP length | Normal CP (PUCCH)/Extended CP(D2D) |
| Pathloss for UE-UE | WINNER + B1 LOS/NLOS |
| Pathloss model for UE-eNB | ITU-R Uma |
| Multipath Channel model | Extended TU (Typical Urban) |
| Tx power control method for PUCCH | Power control in Eq. (1) |
| Tx power control method for D2D | Power control in Eq. (3) ($\alpha = 1.0$, $\Delta_{MCS} = 0$, $f_{D2D} = 0$) |
| D2D boosting power ($\Delta_{boost}$) | 0 dB~30 dB |
| D2D signal Tx time | Downlink PSS/SSS time |
| Noise power | −174 dBm |

TABLE 4-continued

| Parameter | Value |
| --- | --- |
| Noise figure | 9 dB |
| Shadow fading | Standard deviation: 7 dB |
| # of D2D resource in Discovery channel | 44 PRBs × 10 subframes |
| # of Cellular resource in Discovery channel | 6 PRBs × 10 subframes |
| Base power for PUCCH ($P_{0\_PUCCH}$) | −103 dBm |
| Base power for D2D ($P_{0\_D2D}$) | −103 dBm |
| Path-loss compensation factor ($\alpha_{D2D}$) | 1 |

Figure 18:
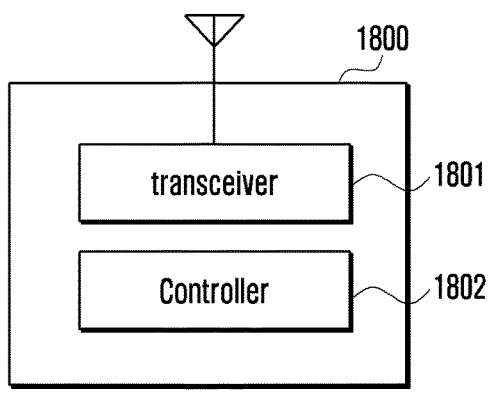
FIG. 18 is a block diagram of a terminal transmitting a D2D discovery signal according to an embodiment of the present disclosure.

FIG. 18 is block diagram of a terminal transmitting a D2D discovery signal according to an embodiment of the present disclosure.

Referring to FIG. 18, the terminal 1800 of the present disclosure may include a communication unit 1801 and a controller 1802.

Although not illustrated, the terminal 1800 may further include components to perform various functions such as a touch screen, a battery, and so forth.

The communication unit 1801 may perform data communication for the terminal 1800.

The controller 1802 may determine at least one symbol for the D2D discovery signal, determine a transmission power to be applied to the determined at least one symbol, and may transmit the D2D discovery signal with the determined transmission power. The controller 1802 may determine at least one symbol for the D2D discovery signal orthogonal to the PUCCH signal of the cellular terminal.

The controller may determine the symbol for the D2D discovery signal, if the terminal is not connected to the base station, based on the PL between the base station and the terminal and the downlink signal path loss at the boundary point to which the position of the symbol for the D2D discovery signal changes. The determining of the symbol may include determining an index for a plurality of symbols determined in advance.

In addition, the controller 1802, when the terminal is in a state of being connected to the base station, may determine the symbol for the D2D discovery signal based on the TAC that is acquired from the upper layer signaling. Or if the terminal is connected to the base station, the controller 1802 may determine a symbol for the D2D discovery signal based on whether to schedule the D2D discovery signal of the terminal by the base station.

In addition, the controller 1802 may determine the transmission power to be applied to the symbol based on at least one of the power amplification value stored in the terminal in advance or a fixed power amplification value provided through the SIB of the base station. In addition, the controller 1802 may determine the transmission power to be applied to the determined at least one symbol based on the position of the transmission resource of the PUCCH signals of the terminal and the distance difference between the transmission resources of the D2D discovery signal.

The controller 1802 may determine the transmission power to be applied to the determined at least one symbol based on the power amplifier value determined based on measuring the interference of the D2D discovery signal by the base station.

At this time, to determine at least one symbol of the D2D discovery signals orthogonal to PUCCH signal of the cellular terminal, the CP of the PUCCH of the cellular terminal is the normal standard, the CP length of the D2D discovery signal is an extended standard, the terminal is connected to the base station, when the PL between the base station and the terminal based on the downlink RSRP is smaller than the downlink signal path loss at the boundary point where the position of the symbol of the D2D discovery signal changes, which is orthogonal to the PUCCH signal of the cellular terminal, the controller 1802 may determine the at least one symbol to be the first symbol group, and, when the PL between the base station and the terminal is equal to or greater than the downlink signal path loss at the boundary point where the position of the symbol of the D2D discovery signals changes, which is orthogonal to the PUCCH signal of the cellular terminal, the controller 1802 may determine the at least one symbol to be the second symbol group.

Or wherein the controller 1802 may determine the at least one symbol to be the first symbol group when the terminal is connected to a base station, and the base station schedules the D2D discovery signal of the terminal.

Or in the PUCCH of the terminal, if the CP is a normal standard and CP length of the D2D discovery signal is an extended standard, when the terminal is connected to the base station and the terminal schedules the D2D discovery signal, when a TAC acquired by the terminal in the uplink synchronization process is smaller than the RTD of the D2D discovery signal at the boundary point where the position of the symbol of the D2D discovery signal changes, which is orthogonal to the PUCCH signal of the cellular terminal, the controller 1802 may determine the at least one symbol to be the first symbol group, and when the TAC is equal to or greater than the RTD of the D2D discovery signal at the boundary point where the position of the symbol of the D2D discovery signals changes, which is orthogonal to the PUCCH signal of the cellular terminal, the controller 1802 may determine the at least one symbol to be the second symbol group.

In the PUCCH of the cellular terminal, if the CP is an extended standard and the CP length of the D2D discovery signal is a normal standard, when the terminal is not connected to the base station, the path loss between the base station and the terminal base on the downlink RSRP is equal to or smaller than the path loss of the downlink signal at the boundary point where the position of the symbol of the D2D discovery signal changes, which is orthogonal to the PUCCH signal of the cellular terminal, the controller 1802 may determine the at least one symbol as a third symbol.

In the PUCCH of the cellular terminal, if the CP is an extended standard and the CP length of the D2D discovery signal is a normal standard, when the terminal is connected to the base station, and the terminal schedules the D2D discovery signal, when the TAC acquired by the terminal in the uplink synchronization process is equal to or smaller than the RTD of the D2D discovery signal at the boundary point where the position of the symbol of the D2D discovery signal changes, which is orthogonal to the PUCCH signal of the terminal, the controller 1802 may determine the at least one symbol to be the third symbol group.

Here, the first symbol group is configured by symbols in which the symbol index is 0, 5, 6, and 11, respectively, the second symbol group is configured by symbols in which the symbol index is 5 and 11, and the third symbol groups may be configured by symbols in which the symbol index is 6 and 13. The controller 1802 may determine a fixed power-amplified value that the terminal may either have in advance in various embodiments, or provided by the SIB of the base station as the transmission power to be applied to the at least one symbol. Or the controller 1802 may determine the power-amplified value determined in accordance with the difference between the position of the transmission resources of PUCCH signal of the cellular terminal and position of the transmission resource of the D2D discovery signal as the transmission power that is applied to the at least one symbol. Or the controller 1802 may determine the power-amplified value which is determined, by the base station, based on the results of measuring the interference of the D2D discovery signals and provided via the upper layer signaling, as the transmission power to be applied to the at least one symbol.

Here, the D2D discovery signal may include at least one of position information of at least one symbol or the transmission power to be applied to the at least one symbol.

Figure 19:
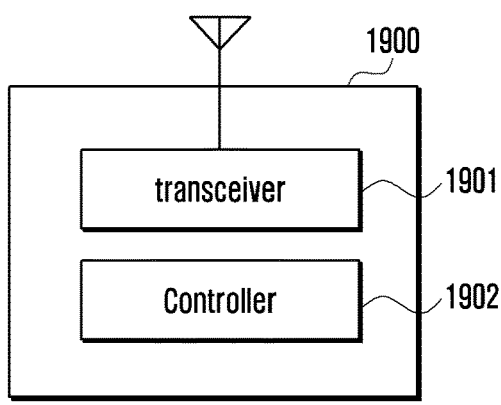
FIG. 19 is a block diagram of a base station supporting a D2D discovery signal transmission according to an embodiment of the present disclosure.

FIG. 19 is a block diagram of a base station supporting a D2D discovery signal transmission according to an embodiment of the present disclosure.

Referring to FIG. 19, the base station 1900 of the present disclosure may include a communication unit 1901 and a controller 1902.

Although not illustrated, the base station 1900 may further include components to perform various functions such as a network interface to connect with other system components, an alternate power source, various management interfaces, and so forth.

The communication unit 1901 may perform data communication of the terminal 1900.

The controller 1902 may determine the power amplification value used to determine the transmission power to be applied to at least one symbol of the D2D discovery signals, and transmit, to the terminal, information on the determined transmission power through upper layer signaling.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for transmitting a device-to-device (D2D) discovery signal by a terminal in a wireless communication system, the method comprising:

determining a first symbol among a plurality of symbols for the D2D discovery signal that is orthogonal to an uplink signal of a cellular terminal, based on a cyclic prefix type of the D2D discovery signal and a cyclic prefix type of the uplink signal different from the cyclic prefix type of the D2D discovery signal;

determining a first transmission power to be applied to the first symbol and a second transmission power to be applied to a second symbol of the plurality of symbols for the D2D discovery signal, wherein the second symbol is not orthogonal to the uplink signal of the cellular terminal; and transmitting the D2D discovery signal based on the first transmission power and the second transmission power, wherein the first transmission power is greater than the second transmission power.

2. The method of claim 1, wherein the uplink signal comprises a physical uplink control channel (PUCCH) signal of the cellular terminal, wherein the cyclic prefix type of the D2D discovery signal and the cyclic prefix type of the uplink signal include a normal cyclic prefix and an extended cyclic prefix, and wherein the determining of the first symbol for the D2D discovery signal comprises, identifying a state between the terminal and a base station, and determining the first symbol for the D2D signal based on cyclic prefix types of the D2D discovery signal and the uplink signal according to the identified state.

3. The method of claim 2, wherein the state between the terminal and the base station is identified, if the terminal is not connected to the base station, based on a path loss (PL) between the base station and the terminal and a downlink signal path loss at a boundary point where a position of the first symbol for the D2D discovery signal changes.

4. The method of claim 2, wherein the state between the terminal and the base station is identified, if the terminal is connected to the base station, based on whether the terminal schedules the D2D discovery signal of the terminal.

5. The method of claim 2, wherein the state between the terminal and the base station is identified, if the terminal is connected to the base station, based on a timing advanced command (TAC) that is acquired from uplink synchronization.

6. The method of claim 1, wherein the determining of the first transmission power and the second transmission power is based on at least one of a power amplification value stored in advance in the terminal or a fixed power amplification value provided through a system information block (SIB) of the base station.

7. The method of claim 1, wherein the determining of the first transmission power and the second transmission power is based on a distance difference between a position of a transmission resource of a physical uplink control channel (PUCCH) signal of the terminal and a position of a transmission resource of the D2D discovery signal.

8. The method of claim 1, wherein the determining of the first transmission power and the second transmission power is based on a power amplification value determined based on a result of measuring the interference of the D2D discovery signal by the base station.

9. The method of claim 1, wherein the determining of the first symbol further comprises determining at least one symbol index corresponding to the first symbol.

10. A method for supporting a device-to-device (D2D) discovery signal transmission by a base station in a wireless communication system, the method comprising:
determining a power amplification value for determining a first transmission power of a first symbol among a plurality of symbols for a D2D discovery signal; and
transmitting, to a terminal, information on the first transmission power of the first symbol through an upper layer signaling,
wherein the first symbol for the D2D discovery signal that is orthogonal to an uplink signal of a cellular terminal is determined based on a cyclic prefix type of the D2D discovery signal and a cyclic prefix type of the uplink signal which is different from the cyclic prefix type of the D2D discovery signal, and
wherein the first transmission power is greater than a second transmission power applied to a second symbol of the plurality of symbols that is not orthogonal to the uplink signal of the cellular terminal.

11. A terminal for transmitting a device-to-device (D2D) discovery signal in a wireless communication system, the terminal comprising:
a transceiver configured to transmit and receive a signal; and
at least one processor configured to:
determine a first symbol among a plurality of symbols for a D2D discovery signal that is orthogonal to an uplink signal of a cellular terminal based on a cyclic prefix type of the D2D discovery signal and a cyclic prefix type of the uplink signal different from the cyclic prefix type of the D2D discovery signal,
determine a first transmission power to be applied to the first symbol and a second transmission power to be applied to a second symbol of the plurality of symbols for the D2D discovery signal, wherein the second symbol is not orthogonal to the uplink signal of the cellular terminal, and
transmit the D2D discovery signal based on the first transmission power and the second transmission power,
wherein the first transmission power is greater than the second transmission power.

12. The terminal of claim 11,
wherein the uplink signal of the terminal comprises a physical uplink control channel (PUCCH) signal of the terminal,
wherein the cyclic prefix type of the D2D discovery signal and the cyclic prefix type of the uplink signal include a normal cyclic prefix and an extended cyclic prefix, and
wherein the determining of the first symbol for the D2D discovery signal comprises, identifying a state between the terminal and the base station, and determining the first symbol for the D2D signal based on cyclic prefix types of the D2D discovery signal and the uplink signal according to the identified state.

13. The terminal of claim 12, wherein the at least one processor is further configured to identify the state between the terminal and the base station, if the terminal is not connected to the base station, based on a path loss (PL) between the base station and the terminal and a downlink signal path loss at a boundary point where a position of the first symbol for the D2D discovery signal changes.

14. The terminal of claim 12, wherein the at least one processor is further configured to identify the state between the terminal and the base station, if the terminal is in a state of being connected to the base station, based on whether the terminal schedules the D2D discovery signal of the terminal.

15. The terminal of claim 12, wherein the at least one processor is further configured to identify the state between the terminal and the base station, if the terminal is connected to the base station, based on a timing advanced command (TAC) that is acquired from uplink synchronization.

16. The terminal of claim 11, wherein the at least one processor is further configured to determine the first transmission power and the second transmission power based on at least one of a power amplification value stored in advance in the terminal or a fixed power amplification value provided through a system information block (SIB) of the base station.

17. The terminal of claim 11, wherein the at least one processor is further configured to determine the first transmission power and the second transmission power based on a distance difference between a position of a transmission resource of a physical uplink control channel (PUCCH) signal of the cellular terminal and a position of a transmission resource of the D2D discovery signal.

18. The terminal of claim 11, wherein the at least one processor is further configured to determine the first transmission power and the second transmission power based on a power amplification value determined based on a result of measuring the interference of the D2D discovery signal by the base station.

19. The terminal of claim 11, wherein the at least one processor is further configured to determine at least one symbol index corresponding to the first symbol.

20. A base station for supporting a device-to-device (D2D) discovery signal in a wireless communication system, the base station comprising:
- a transceiver configured to transmit and receive a signal; and
- at least one processor configured to:
  - determine a power amplification value for determining a first transmission power of a first symbol among a plurality of symbols for a D2D discovery signal, and
  - transmit information on the first transmission power of the first symbol to a terminal through an upper layer signaling,
- wherein the first symbol for the D2D discovery signal that is orthogonal to an uplink signal of a cellular terminal is determined based on a cyclic prefix type of the D2D discovery signal and a cyclic prefix type of the uplink signal which is different from the cyclic prefix type of the D2D discovery signal, and
- wherein the first transmission power is greater than a second transmission power applied to a second symbol of the plurality of symbols that is not orthogonal to the uplink signal of the cellular terminal.

* * * * *